United States Patent
Frattura et al.

(10) Patent No.: US 7,936,770 B1
(45) Date of Patent: May 3, 2011

(54) METHOD AND APPARATUS OF VIRTUAL CLASS OF SERVICE AND LOGICAL QUEUE REPRESENTATION THROUGH NETWORK TRAFFIC DISTRIBUTION OVER MULTIPLE PORT INTERFACES

(75) Inventors: David E. Frattura, Boston, MA (US);
Richard Graham, Derry, NH (US);
John Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 614 days.

(21) Appl. No.: 11/371,990

(22) Filed: Mar. 8, 2006

Related U.S. Application Data

(60) Provisional application No. 60/659,853, filed on Mar. 8, 2005.

(51) Int. Cl.
H04L 21/28 (2006.01)
(52) U.S. Cl. .......................... 370/412; 370/351; 370/357
(58) Field of Classification Search .......... 370/412–419, 370/351, 357
See application file for complete search history.

(56) References Cited

U.S. PATENT DOCUMENTS

| | | | | |
|---|---|---|---|---|
| 6,032,266 | A * | 2/2000 | Ichinohe et al. | 714/9 |
| 6,104,700 | A * | 8/2000 | Haddock et al. | 370/235 |
| 6,160,812 | A * | 12/2000 | Bauman et al. | 370/416 |
| 6,438,134 | B1 * | 8/2002 | Chow et al. | 370/412 |
| 7,006,438 | B2 * | 2/2006 | West et al. | 370/231 |
| 7,099,275 | B2 * | 8/2006 | Sarkinen et al. | 370/230 |
| 7,292,580 | B2 * | 11/2007 | Ramamurthy et al. | 370/395.42 |
| 2004/0141504 | A1 * | 7/2004 | Blanc et al. | 370/394 |
| 2004/0213264 | A1 * | 10/2004 | Mistry et al. | 370/395.7 |
| 2005/0201398 | A1 * | 9/2005 | Naik et al. | 370/412 |

OTHER PUBLICATIONS

IEEE Std 802.3-2002, carrier sense multiple access with collision detection(csma/cd) access method and physical layer specifications, Mar. 8, 2002.*

Virtual Trunking and Traffic Shaping on BPX 8600 Series, Cisco, 1999.*

IEEE, "Section 43. Link Aggregation," 802.3, IEEE Standard for Information Technology, Part 3: Carrier sense multiple access with collision detection (CSMA/CD) access method and physical layer specifications, *IEEE Standards*, The Institute of Electrical and Electronics Engineers, Inc., pp. 282-345 (2002).

* cited by examiner

*Primary Examiner* — Thuha T. Nguyen
*Assistant Examiner* — Gautam Sharma
(74) *Attorney, Agent, or Firm* — McCarter & English, LLP

(57) ABSTRACT

A method and apparatus are provided that allows for the representation of a larger number of classes of network traffic and logical queues than is physically available on a per port basis within a network device. A number of logical queues, whose number can match the number of classes of network traffic a network device handles, may be supported across an aggregated set of ports even though the network device has fewer physical queues per port than there are classes of network traffic. The method and apparatus improve the management of network traffic sensitive to time delay and jitter, and further facilitates the operation of these applications in a simultaneous or near simultaneous manner.

20 Claims, 24 Drawing Sheets

| Storage | | |
|---|---|---|
| Class | Logical Queue | Physical Queue |
| High Priority | 2 | 2 |
| Best Effort | 3 | 3 |
| Control Priority | 0 | 0 |
| Voice | 1 | 1 |

Storage

| Class | Logical Queue | Physical Queue | Port |
|---|---|---|---|
| High Priority A | 0 | 0 | 0 |
| Best Effort | 1 | 1 | 0 |
| Control Priority | 2 | 2 | 0 |
| Voice 1 | 3 | 3 | 0 |
| Video 1 | 4 | 0 | 1 |
| Storage 1 | 5 | 1 | 1 |
| Assured Class 1 | 6 | 2 | 1 |
| High Priority B | 7 | 3 | 1 |
| High Priority C | 8 | 0 | 2 |
| High Priority D | 9 | 1 | 2 |
| Assured Class 2 | 10 | 2 | 2 |
| Assured Class 3 | 11 | 3 | 2 |
| Voice 2 | 12 | 0 | 3 |
| Video 2 | 13 | 1 | 3 |
| Storage 2 | 14 | 2 | 3 |
| Assured Class 4 | 15 | 3 | 3 |

*Fig. 5*

| Storage | | |
|---|---|---|
| Class | Logical Queue | Physical Queue |
| Control Class | 0 | 16A |
| Expedited Class A | 1 | 16E |
| Expedited Class B | 2 | 16I |
| Expedited Class C | 3 | 16M |
| Assured Class 1 | 4 | 16B |
| Assured Class 2 | 6 | 16C, 16G, 16k, 16O |
| Assured Class 3 | 7 | 16D, 16H, 16K, 16P |
| Best Effort Class | 5 | 16F, 16J, 16N |

*Fig. 7*

| Logical Queue | Logical Queue Weighting Factor | Logical Queue to Physical Port Queue Mapping | Port and Physical Queue Weighting Factor | If Port 0 Fails, Re-Mapped Logical Queue to Physical Port/Physical Queue Mapping | If Port 0 & 1 Fail, Re-Mapped Logical Queue to Physical Port/Physical Queue Mapping | If Port 0, 1, & 2 Fail, Re-Mapped Logical Queue to Physical Port/Physical Queue Mapping |
|---|---|---|---|---|---|---|
| 0 | 8 | port0/physical queue 0 | 8 | port2/physical queue 0 | port2/physical queue 0 | port3/physical queue 0 |
| 1 | 8 | port1/physical queue 0 | 8 | port1/physical queue 0 | port3/physical queue 0 | port3/physical queue 0 |
| 2 | 7 | port2/physical queue 0 | 7 | port3/physical queue 0 | port2/physical queue 1 | port3/physical queue 1 |
| 3 | 7 | port3/physical queue 0 | 7 | port1/physical queue 1 | port3/physical queue 1 | port3/physical queue 1 |
| 4 | 6 | port0/physical queue 1 | 6 | port2/physical queue 1 | port2/physical queue 1 | port3/physical queue 1 |
| 5 | 5 | port1/physical queue 1 | 5 | port3/physical queue 1 | port3/physical queue 1 | port3/physical queue 1 |
| 6 | 4 | port2/physical queue 1 | 4 | port3/physical queue 1 | port3/physical queue 1 | port3/physical queue 1 |
| 7 | 3 | port3/physical queue 1 | 3 | port3/physical queue 1 | port3/physical queue 1 | port3/physical queue 1 |

METHOD AND APPARATUS OF VIRTUAL CLASS OF SERVICE AND LOGICAL QUEUE REPRESENTATION THROUGH NETWORK TRAFFIC DISTRIBUTION OVER MULTIPLE PORT INTERFACES

RELATED APPLICATIONS

This present application claims priority to U.S. Provisional Patent Application No. 60/659,853, entitled "Method And Apparatus Of Virtual Class Of Service And Logical Queue Representation Through Network Traffic Distribution Over Multiple Port Interfaces", filed Mar. 8, 2005, which is incorporated herein by reference.

TECHNICAL FIELD OF INVENTION

The present invention generally relates to network communications and, more particularly, to an apparatus and method for management of network traffic in a network.

BACKGROUND OF INVENTION

To help ensure the timely delivery of information on networks and set priorities for selected network traffic, network devices, such as switches, routers, wireless LAN access points and bridges, typically include a fixed number of queues per physical network interface. With the increase in volume of time sensitive network traffic and the need to monitor and control traffic flow according to one or more constraints, it is often necessary for a network device to have and support a large number of physical queues per network interface. Unfortunately, it is often impractical for a network device to include and support a large number of unique physical queues per network interface, such as, eight or more physical queues per network interface. Nonetheless, more than eight physical queues per interface are often needed to support various classes of network traffic.

To address the need for network traffic shaping and policing, some network devices use a fixed number of dedicated physical queues per network interface. Other network devices use a virtual output queuing technique, while other network devices rely upon a shared memory buffer queue model for shaping and policing network traffic. Nevertheless, the need exists for a network device and method that readily handles both network traffic sensitive to time delay and network traffic sensitive to jitter, such as voice-over IP network traffic and storage-over IP network traffic, respectively, and also facilitate the operation of these applications simultaneously or in a near simultaneous manner. Moreover, use of such a network device and method allows a network provider or operator to support multiple classes of network traffic having the same level of prioritization, for example, multiple equal, but different, expedited traffic classes, which are typically reserved for the highest priority communications traffic.

SUMMARY OF THE INVENTION

The illustrative embodiment of the present invention provides a method and apparatus that enable the use of multiple logical queues to control and manage network traffic. Various classes of network traffic are mapped to the logical queues, which, in turn, are mapped to physical queues associated with one or more ports. The logical queues are associated with, and may represent, multiple physical ports or physical queues or buffers associated with a physical port. The multiple logical queues allow a network device to provide different classes of network traffic on one port or interface. Further, the method and apparatus of some embodiments of the present invention allow for the management of or the control of network traffic with or without various scheduler mechanisms, and with or without traffic shaping and limiting capabilities. The method and apparatus of the present invention allow for control and management of network traffic independent of the actual queuing methodology used by the network device. Such queuing methodologies include, but are not limited to, first in first out (FIFO) queuing, priority queuing, fair queuing, weighted fair queuing (WFQ), class based queuing (CBQ), and the like. The illustrative embodiment of the present invention also allows for the interconnection of multiple interfaces between network devices to allow for selective traffic distribution between the devices and throughout the network based on the mapping of traffic classes to the logical queues, and the mapping of the logical queues to physical queues.

Further, the present invention provides an approach that allows a network device to receive network traffic assigned different classifications, for example, network traffic assigned different priorities, associate selected network traffic with one or more logical queues according to the classification of the selected network traffic, and, in turn, forward the selected network traffic to a physical queue associated with one of the logical queues according to the classification of the selected network traffic. Furthermore, the present invention supports various forms of link aggregation. Accordingly, two or more physical network interfaces of a network device can be bundled or grouped together and represented as a single logical interface or virtual port. In this manner, an increase in the amount of communication bandwidth between two network devices can be realized than is available on a per interface basis. Accordingly, an improvement in a network's ability to support time delay sensitive network traffic and jitter-sensitive network traffic is realized. Moreover, the present invention facilitates the operation of these applications in a simultaneous or a near simultaneous manner. That is, the present invention allows for multiple expedited traffic classes, for example, time sensitive and jitter sensitive classes of traffic.

In one embodiment of the present invention, an apparatus associated with a network is disclosed. The apparatus includes a logical scheduler to associate an attribute of a data unit the apparatus is capable of receiving to a logical queue. The logical queue is further associated with a port, and, in turn, a forwarding mechanism forwards the selected data unit to the port associated with the logical queue.

The apparatus can further include a link aggregated interface to represent two or more ports of the apparatus as a virtual port or logical interface. The apparatus can additionally include a data unit classification mechanism to assign received data units to a traffic class based on the attribute of the data unit. The assignment of the data unit to the traffic class associates the data unit with one or more of the logical queues, and hence, with one or more ports of the apparatus. The apparatus further includes one or more input ports to receive the data unit. The apparatus can further include one or more scheduler mechanisms to manage traffic flow across the ports.

In another embodiment of the present invention, a method is performed in a network device associated with a network. Performance of the method provides a number of logical queues. The network device includes a number of physical queues associated with a number of ports of the network device. Each of the ports include one or more physical queues. Performance of the method associates a number of traffic classes or traffic classifications supported by the network with the logical queues and forwards network traffic to the ports based on the class or the classification of the network traffic.

Performance of the method can further aggregate two or more of the ports to represent selected ports as a virtual port or a logical interface. Further, performance of the method parses a unit of network traffic received by the network device to identify a desired attribute of the unit of network traffic and assigns the unit of network traffic to one of the traffic classes or classifications based on the desired attribute. If desired, performance of the method can further classify each unit of network traffic received by the apparatus according to a type of network traffic transported by the network and based on the classification of each unit of network traffic assign one of the traffic classes to each unit of network traffic. The method allows the mapping of network traffic to physical queues distributed across a number of ports. Further, the method allows for the mapping of network traffic to physical queues without regard for queuing architecture. For example, the method is well suited for mapping network traffic across queuing architectures, such as shared memory, dedicated buffer queues per port, virtual output queues, and the like.

In a further embodiment of the present invention, a method of managing network traffic of a number of network classes or classifications received on one or more inputs of a network device coupled to a network is disclosed. The method includes steps of associating the network traffic to one or more logical queues according to the class of the network traffic and forwarding the network traffic to one or more ports according to the association between class or classification of the network traffic, the logical queues and the ports. In this manner, the network device performing the method improves on its ability to manage network traffic transmitted on or across each of the ports because different classes of network traffic having the same or different priorities can be associated with a port, virtual or otherwise, of the network device. The method can further include the step of forwarding a portion of the network traffic to a port or an interface according to a load balancing mechanism to manage the network traffic across two or more ports or interfaces.

Further steps of the method can include restricting an amount of network traffic transmitted on one of the ports according to a plurality of classes or a plurality of classifications of network traffic. The method can restrict an amount of network traffic by rate shaping a portion of the network traffic or by rate limiting a portion of the network traffic according to one of the classes or classifications of network traffic managed by the network device.

The method can further include the steps of detecting an error condition of the network device and determine if the detected error condition affects assertion of network traffic on one or more ports. The method can further include the step of taking an action to maintain a predetermined level of network traffic managed by the network device if the detected error affects certain network traffic across the ports. The step of taking an action can include the step of determining which of the one or more ports are affected by the detected error and remapping the logical queues associated with the affected port or ports to the other ports free of the detected error. In addition, the method can further include the steps of determining which of the one or more ports are affected by the detected error and load balance the network traffic across the ports free of the detected error when taking an action to maintain the predetermined level of network traffic.

In one embodiment of the present invention, a device readable medium holding device executable instructions for performing a method in a network device associated with a network is disclosed. The medium includes instructions for performing the method that includes the steps of providing a number of logical queues associated with a number of ports of the network device. Execution of the instructions held by the medium further associates a number of traffic classes supported by the network device to the logical queues and in turn, to one or more of the ports to associate at least one of the ports with one or more traffic classes.

In a further embodiment of the present invention, a device readable medium holding device executable instructions for performing a method in a network device associated with a network is disclosed. The method allows the network device to manage network traffic of a number of network classes received on one or more inputs of the network device. Execution of the instructions held by the medium performs the method that associates network traffic to one or more logical queues according to the classification of a unit of network traffic. The logical queues are associated with one or more ports of the network device. In this manner, the network device can direct units of network traffic having a particular class or classification to a particular port and manage network traffic transmitted on each of the ports according to the classes or classifications of network traffic associated with each of the ports.

BRIEF DESCRIPTION OF THE DRAWINGS

The illustrative embodiment of the present invention will be described below relative to the following drawings.

FIG. 5 illustrates an exemplary association of network traffic, logical queues, and physical queues for the exemplary apparatus illustrated in FIG. 4.

FIG. 7 illustrates an exemplary association of network traffic, logical queues, and physical queues for the exemplary apparatus illustrated in FIG. 6.

FIG. 14B is a table illustrating the configuration of the exemplary apparatus illustrated in FIG. 14A after detection of the error condition.

DETAILED DESCRIPTION

Figure 1:
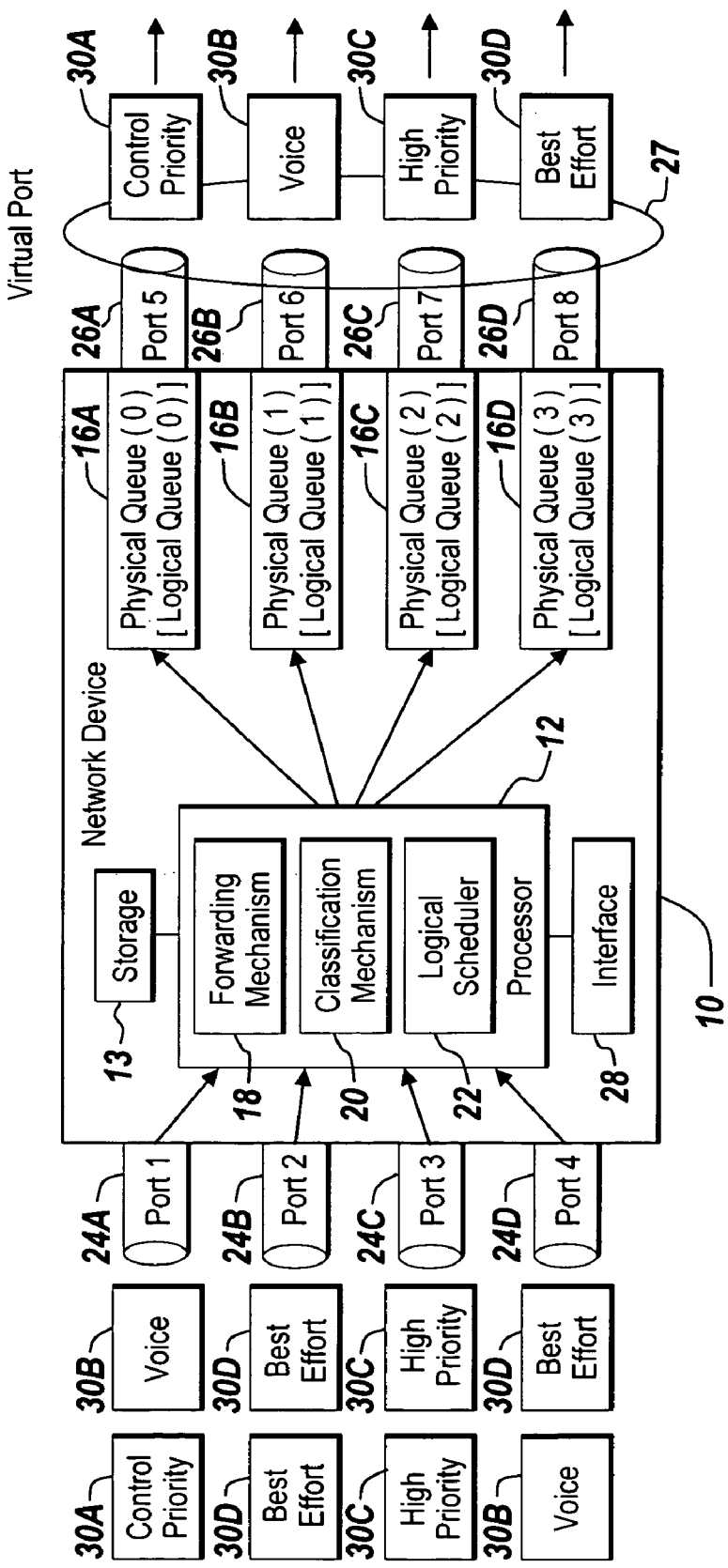
FIG. 1 illustrates an exemplary apparatus suitable for use in practicing the illustrative embodiment of the present invention.

The illustrative embodiment of the present invention facilitates management of network traffic in a network environment to improve delivery and management of network traffic, including time sensitive network traffic and jitter sensitive network traffic. The illustrative embodiment of the present invention further facilitates the simultaneous or near simultaneous operation of time sensitive network traffic and jitter sensitive network traffic applications, for example, voice-over IP and storage-over IP applications. The method and apparatus of the present invention allow a network device to realize improved network traffic management capabilities and improved class of service capabilities.

The method and apparatus of the illustrative embodiment allow a network device to realize a number of logical queues associated with a number of ports of the network device. A port of the network device includes one or more physical queues. This allows the network device to provide for different classes of network service on each port. That is, selected network traffic received by the network device is forwarded to a port based on a logical queue associated with an attribute of the selected network traffic and the port. The attribute represents a desired service characteristic for the associated unit of network traffic. As a result, the illustrative embodiment of the present invention allows a network device to realize support for increased quality of service and class of service capabilities by providing network traffic having different classes of service on one port or physical interface, by is providing network traffic having like priorities across a number of ports or physical interfaces, or both. Moreover, according to the illustrative embodiment present invention, multiple ports of a network device are definable as a link aggregated interface.

As such, a port and a physical queue of the port can be associated with a logical queue and a selected type or class of network traffic. Accordingly, some number of physical queues present on a physical port can be left unused. For example, according to the present invention, it is possible to have a network device with four physical queues per physical port and have the physical ports configured to form a link aggregation group port or multi-link point-to-point protocol link. The aggregated port could have associated therewith a logical queue per physical port by which all network traffic associated with the logical queue is sent to a single physical queue of the physical port. That is, the aggregated port or interface has four logical queues representing four physical queues for the aggregated port even though the four physical ports have sixteen physical queues in total. As such, a network device configured in this manner would allow for deeper buffers per port. Normally each queue is composed of some amount of buffer memory. If all buffers associated with a port are mapped to one queue, the forwarding system of the network device gains more flexibility Moreover, the logical queues for a logical or a virtual interface, such as a link aggregated interface may number in excess of the physical queues available to network traffic on a per physical interface basis. That is, the total number of logical queues can exceed the number of physical queues of any one physical interface of the network device forming the linked aggregated interface. Each of the logical queues is assignable to selected network traffic according to a characteristic of the network traffic that indicates a service requirement for the selected network traffic. As such, the network device is configurable to transport, manage, and control different classes of network traffic including multiple like classes of network traffic on each physical interface of the network device.

Before continuing with the discussion below it is helpful to first define a few terms used herein.

The term "network device" as used herein, refers to a network device or apparatus configured for use in a network environment that is able to understand and perform operations with data according to a data link layer protocol or a network layer protocol, or both. A network device includes at least one port for receiving network traffic and at least one port for transmitting network traffic.

The term "time-delay" as used herein, refers to the time it takes a selected unit of network traffic, such as a packet, to cross a network from a source to a destination.

The term "jitter" as used herein, refers to the difference in delay of a first packet through a network path as compared with a second packet to the same destination. This variability of delay can present problems for some protocols.

The term "class of network traffic" as used herein refers to a technique or methodology of classifying and if necessary prioritizing a unit of network traffic based on a type of network traffic, for example, voice traffic, video traffic, file transfer traffic, transaction processing traffic, or network traffic based on the type of user, for example, a CEO, a secretary, or network traffic based on other attributes. The classification of network traffic on a unit basis is performed by examining selected parameters, attributes, or markers as described in detail herein.

The term "logical queue" as used herein refers to a logical representation, or a logical use, or both of a physical queue or storage arrangement.

The term "logical scheduler" as used herein refers to a mechanism that determines the appropriate physical queue for a unit of network traffic according to the classification of the unit of network traffic and an association of the classification of the unit with a logical queue.

FIG. 1 illustrates an apparatus suitable for practicing the illustrative embodiment of the present invention. Network device 10 represents a packet or signal forwarding network device suitable for performing OSI layer 2 data communications, OSI layer 3 data communications, OSI layer 4 to 7 data communication or all data communications. For example, network device 10 may be, but is not limited to a bridge, a switch, a firewall, or a router. Furthermore, those skilled in the art will appreciate that the present invention supports a number of communication architectures, and is not limited to IEEE Standard 802 devices, time division multiplexing devices, asynchronous transfer switching devices, fiber channel fabric switching devices, or other such devices like Internet small computer system interface (iSCSI) compatible device, Internet foundation classes (IFC) compatible device, or other storage networking device or computing systems where multiple parallel cross bar links link multiple computational elements within the system. Moreover, queue architectures suitable for use with the present invention are not limited to those queue architectures used in network switches or routers. Those skilled in the art will appreciate that the present invention is applicable to any electronic device applying queuing techniques to manage network traffic of different priorities.

The network device 10 includes input ports 24A-24D, processor 12, storage device 13, forwarding mechanism 18, classification mechanism 20, logical scheduler 22, physical queues (0-3) 16A-16D, and output ports 26A-26D. Network device 10 can further include an interface 28 accessible to a user of network device 10. Network device 10 is configurable to include a virtual port 27 (i.e., a link aggregation group) formed from two or more selected ports and representable as the virtual port 27. Those skilled in the art will recognize that network device 10 is adaptable to include a link aggregation group formed from two or more input ports 24A-24D or a link aggregation group formed from two or more output ports 26A-26D.

Logical scheduler 22 is configurable to map a logical queue to a port of the network device 10 and configurable to determine the appropriate logical queue for a unit of network traffic according to the classification of the unit of network traffic and an association of the classification of the unit with a logical queue. As such, the logical scheduler 22 logically schedules network traffic in order to allocate bandwidth and manage network traffic across selected ports of the network device 10. Classification mechanism 20 is configured to examine and classify the various types or classes of network traffic managed by the network 10 based on predefined criteria. Forwarding mechanism 18 forwards the various types or classes of network traffic managed by the network 10 to one or more of the physical queues based on the classification provided by the classification mechanism 20 and the logical scheduling provided by the logical scheduler 22.

The logical scheduler 22 can create a data structure to hold the mapping between logical queues and the ports. One suitable data structure is a Look-Up Table (LUT) held by the storage device 13. Those skilled in the art will recognize that the LUT can also be held by the logical scheduler 22.

The mapping or association of a port to a logical queue in the network device 10 is based upon the various types and classes of network traffic managed by the network device 10. In this manner, which will be described in more detail below, selected classes or types of network traffic are mappable to one or more ports to allow for multiple but equal classes of network traffic to be asserted by the network device 10 in a simultaneous or near simultaneous manner. The logical scheduler 22, classification mechanism 20, and forwarding mechanism 18 allow network device 10 to realize a total number of logical queues (0-3) that exceeds the number of physical queues associated with any single physical port of the virtual port 27. That is, the logical scheduler 22, classification mechanism 20, and forwarding mechanism 18 allow the network device 10 to handle and manage a larger number of classes of network traffic without an increase in the number of physical queues supported by each of the physical ports forming the virtual port 27. In this manner, network device 10 supports improved quality of service (QoS) capabilities and improved class of service (CoS) capabilities on virtual port 27 than would otherwise be possible without such a configuration. Accordingly, network device 10 can support, if desired, multiple priority classes of network traffic, for example, multiple equivalent "expedited forwarding" classes of network traffic.

Network device 10 receives network traffic 30A-30D on the input ports 24A-24D, processes selected network traffic, and forwards the selected network traffic to one or more of output ports 26A-26D for forwarding to another portion of the network. Network traffic 30A-30D represent selected exemplary classes of network traffic network device 10 is capable of handling. For example, network traffic 30A represents a data unit characterized as belonging to a control priority class of network traffic; network traffic 30B represents a data unit characterized as belonging to a voice over IP (VOIP) class of network traffic; network traffic 30C represents a data unit characterized as belonging to a high priority class of network traffic; and network traffic 30D represents a data unit characterized as belonging to a best effort class of network traffic. Those skilled in the art will recognize that the classifications associated with network traffic 30A-30D are merely illustrative and that any number of network traffic classifications is well suited for use in practicing the illustrative embodiment of the present invention.

Logical scheduler 22 can receive requests via interface 28 for mapping or associating the ports 26A-26D to logical queues (0-3), as illustrated in FIG. 1, based on various classes of network traffic the network device 10 is capable of handling. Further, a network operator or a system administrator can also instruct or request the logical scheduler 22 to associate the ports and the logical queues (0-3) based on a service requirement for a class or type of network traffic. Those skilled in the art will appreciate that the number of physical queues and logical queues (0-3) illustrated in FIG. 1 is merely illustrative and is meant to facilitate understanding of the present invention. In turn, the logical scheduler 22, according to requests received via interface 28 maps or associates a class of network traffic to one or more of the ports 26A-26D according to an association between one or more of the logical queues (0-3), the physical queues (0-3) 16A-16D and the traffic class. In this manner, network device 10 can provide one class of network traffic on a selected interface or provide multiple classes of network traffic on a selected interface, for example the virtual port 27. Those skilled in the art will recognize that interface 28 is representable to a user as a command line interface (CLI), a graphical user interface (GUI), a menu driven interface or other suitable interface, either locally or remotely. The logical scheduler 22 in conjunction with the classification mechanism 20 allows network device 10 to classify and prioritize network traffic so that different classes of network traffic are placed on ports 26A-26D for transmission.

Classification mechanism 20 examines and classifies the various types or classes of network traffic managed by network device 10 based on predefined criteria. Forwarding mechanism 18 forwards network traffic from the input ports 24A-24D to physical queues (0-3) 16A-16D of output ports 26A-26D according to the classification to physical queue mapping provided by logical scheduler 22. The forwarding of the network traffic by the forwarding mechanism 18 represents a logical queue mapping associated with a traffic class. The mapping provided by the logical scheduler 22 assists in scheduling network traffic into the physical queues (0-3) 16A-16D. That is, the association or mapping of the classes of network traffic to the physical queues by the logical scheduler 22 allows a selected physical queue to handle network traffic of a selected service level and allows the other physical queues to handle network traffic having other service levels in order to minimize traffic congestion for network traffic associated with the selected service level. As such, network device 10 forwards selected ingress network traffic according to a network traffic classification type to logical queue to physical queue mapping of output ports 26A-26D.

Those skilled in the art will appreciate that the present invention beneficially allows a network operator to define a link aggregated interface having two or more physical ports and represent the link aggregated interface as a virtual interface or virtual port with more queues than are available with a single port of the link aggregated interface. This affords a network operator an improvement in network traffic management allowing the network operator to forward different classes of network traffic to each physical queue of the link aggregated group based on a logical queue mapping associated with the network traffic classes or other predefined criteria.

FIG. 1 further illustrates the network device 10 configured with a link aggregation group or the virtual port 27. The link aggregation group allows the bundling or grouping of two or more output ports 26A-26D to represent a single physical interface. One benefit of creating the virtual port 27 is the increase in the amount of communication bandwidth that is available as compared to the amount of communication bandwidth available on a per port basis. The increase in communication bandwidth can be accomplished by load balancing network traffic over the physical ports forming the virtual port 27.

As illustrated in FIG. 1, each output port 26A-26D represents a particular class of network traffic. In this manner, network device 10 is capable of representing four types or classes of network traffic on the virtual port 27, even though each of the physical ports 26A-26D has one physical buffer and, hence, supports one class of network traffic. In other words, the network device 10 includes physical queues (0-3) 16A-16D and each physical port 26A-26D is configured to include one physical queue per port. As such, the virtual port 27 has associated therewith more queues than are physically available on a per physical port basis. Those skilled in the art will appreciate the number of physical queues illustrated in FIG. 1 are merely illustrative and the number of physical queues associated with each of the ports of the network device 10 can be any suitable number according to an application or environment in which the network device operates, or an architecture of the network device 10. Further, those skilled in the art will appreciate that the present invention can represent the virtual port 27 as a port with N queues, where N is some number greater than the number of the physical queues supported on a per port basis.

As such, according to a selected mapping, network 10 places network traffic 30A classified as belonging to a "control" class of network traffic on port 26A. Generally, a "control" class of network traffic represents network traffic with greatest importance. In similar fashion, network device 10 places on port 26B network traffic 30B classified as belonging to a voice class of network traffic. Generally, a voice class of network traffic represents network traffic with great importance sensitive to jitter and time delays. Likewise, network device 10 places on port 26C network traffic 30C classified as belonging to a "high priority" class of network traffic; and the network device 10 places on port 26D network traffic 30D classified as belonging to a "best effort" class of network traffic. Consequently, network device 10 is well suited to support time sensitive applications and jitter sensitive applications, such as Voice over IP and storage over IP, respectively, and further provide the simultaneous or near simultaneous operation of these applications.

Moreover, network device 10 supports multiple equal, but different expedited classes of network traffic, which are normally reserved for the absolute highest priority network traffic. Network device 10 is capable of providing the above described network traffic management capabilities independent of the actual queuing methodology or technique used by the network device 10. For example, some network devices use fixed dedicated buffer queues per port, while other network devices use a virtual output queuing methodology, while still others use a shared memory buffer queue model so long as the network device provides ingress queuing and egress queuing of network traffic. Nonetheless, network device 10 provides the above described network traffic distribution over multiple port interfaces or over a link aggregation group representing a virtual port independent of any such queuing technique. Further, network device 10 is well suited for use with or without various scheduler mechanisms, with or without various traffic shaping mechanisms, and with or without various traffic limiting mechanisms. These features and benefits are discussed below in more detail.

Before continuing the discussion below, it is helpful to first discuss the concepts of link aggregation and network traffic classification. Numerous network devices support various implementations of link aggregation technology. Link aggregation technology allows two or more physical interfaces to be "bundled" together and represented in a network environment as a single logical interface, often called a virtual port. A significant benefit of link aggregation technology is the realization of an increase in the amount of bandwidth usable between two network devices than is available on a per physical interface basis. The improvement in usable bandwidth is accomplished by load balancing network traffic over the multiple physical interfaces forming the link aggregation. For example, N physical interfaces with a bandwidth capacity of X are link aggregated to create a new logical port or virtual port with (N multiplied by X) bandwidth capacity. Another example of multiple link technology suitable for use with the present invention is inverse multiplexing over ATM (IMA) where a single ATM cell stream is split across multiple access circuits from the user site to the edge of the carrier's ATM network. A further example of multiple link technology suitable for use with the present invention includes Multilink Point-to-Point Protocol (MPPP) where packet data traffic can be spread across multiple serial WAN links in order to increase transmission speed.

Another example of multi-path forwarding technologies is found in the Policy Routing technology that is provided in the X-Pedition and Matrix N-Series products from Enterasys Networks of Andover Mass. Policy Based routing is a technology created to provide network operators with the ability to choose the transmission interface for a network data unit, for example, a packet based on classification rules as opposed to routing topology information normally used by routing systems to forward the data unit. In one implementation, Policy Routing functions utilize one or more transmission ports to forward traffic to an intended destination. Further, the Policy Routing functions leverage selected load balancing methods to distribute network traffic over multiple paths. With a Policy Routing function, a classification function can be utilized to forward a network data unit to the destination by choosing the port or ports associated with a policy routing port and override what would have been an appropriate transmit interface or port according to a non-policy based dynamic routing protocol.

Further, conventional traffic distribution mechanisms typically load share network traffic over each of the physical interfaces in a network device without regard for network traffic queues associated with each individual physical interface. Nonetheless, in network devices having traffic distribution mechanisms that account for the physical queues of the physical interfaces, the virtual port formed by the link aggregation group represents the physical queues that are present in each of the physical interfaces. That is, if there are four physical queues per physical interface, then there are four queues represented by the virtual port representing the link aggregation group. As such, classes of network traffic assigned to a specific queue are maintained regardless of what physical interface the traffic is transmitted from. An additional benefit of link aggregation technology is the fact that the technology provides improved inter-device connection failover times that are typically much less than traditional redundancy protocols, such as the IEEE spanning tree algorithm.

Link aggregation technologies and methodologies suitable for practicing the illustrative embodiment of the present invention are described in the Enterasys Networks Smart Trunk Technology documentation available from Enterasys Networks of Andover, Mass. Other suitable link aggregation technologies and methodologies are described in IEEE standard 802.3AD link aggregation protocol for link aggregation in LAN switches, routers, access points, and LAN attached end systems. Other link aggregation technologies and methodologies suitable for practicing the illustrative embodiment of the present invention include multiple link point-to-point protocol, and multiple link inverse multiplexing technologies for link aggregation in WAN router systems. Nevertheless, those skilled in the art recognize that there are a number of suitable methodologies and technologies to create a link aggregation group between network devices to bundle multiple physical interfaces together to form an aggregated interface. Furthermore, those skilled in the art will recognize that the present invention does not require the formation or creation of a link aggregated group and is well suited for use in any network environment where multiple physical interfaces are connected between network devices, such as between two crossbar switches. In other cases both direct and indirect paths between two devices may be used.

With respect to the definition of class of network traffic defined above, the classification of network traffic is the ability of a network device to parse and classify ingress network traffic based on various parameters, attributes or markers specific to that form of network traffic. In a data communication network environment, network traffic is classifiable at the various levels of the OSI model for assignment to a defined traffic class. For example, in LAN environments network traffic is classifiable and assigned to classes of network traffic based on an attribute in a selected field. Such fields include, but are not limited to, a source media access control (MAC) address, a destination MAC address, a packet type, priority bits, such as those defined by IEEE standards; 802.11, 802.12, 802.16, 802.17, 802.1Q, 802.1P, or any combination thereof. Further, the classification of network traffic can be based on any layer in the OSI model including information such as user identity, application or physical location.

Other criteria suited for classifying network traffic in accordance with the present invention include the classification of packets based on the Internet Protocol version 4 (IPv4) by examining one or more packet fields, including a source Internet address field, a destination Internet address field, an IP packet-type field and an IP fragment field. Other IPv4 network traffic classification techniques include the examination and classification of transport forward/application level data, such as Internet Control Message Protocol (ICMP) message type, transmission control protocol (TCP) source or destination port, user datagram protocol (UDP) source or destination port, Stream Control Transmission Protocol (SCTP) source or destination port, SCTP chunk information, such as the chunk fields within a chunk, for example, the chunk-type field, the chunk flag, the chunk month, the chunk data, and other like chunk fields.

Moreover, other network traffic including a packet based on the Internet Protocol version 6 (IPv6) is classifiable and assignable to a class of network traffic by examining one or more of the packet fields including the source Internet address field, the destination Internet address field, the traffic class field value, the flow label field, the next header field, the transport forward/application level data fields, such as the ICMP message type, the TCP source or destination port, the UDP source or destination port, the SCTP source or destination port, the SCTP chunk fields, or various option header fields associated with the packet.

Those skilled in the art will appreciate that the present invention is not limited to supporting classification of network traffic based on one or more "layer 2" fields, IPv4 fields, IPv6 fields, TCP fields, UDP fields, or SCTP fields. The present invention can classify network traffic by examining any range of bits in a data unit, for example, a data unit of any protocol. For example, the illustrative embodiment of the present invention is equally applicable to data communication network environments and to telephonic communication network environments. As such, in a telephonic communication network environment, network traffic is classifiable by a source node number, for example, the phone number or extension of the caller, a destination node number, for example, the phone number or extension of the destination phone, or by tariff class associated with the particular service customer or service being provided. Furthermore, network traffic associated with a telephonic communication network is classifiable by physical location, user identity, and system identity.

Figure 1A:
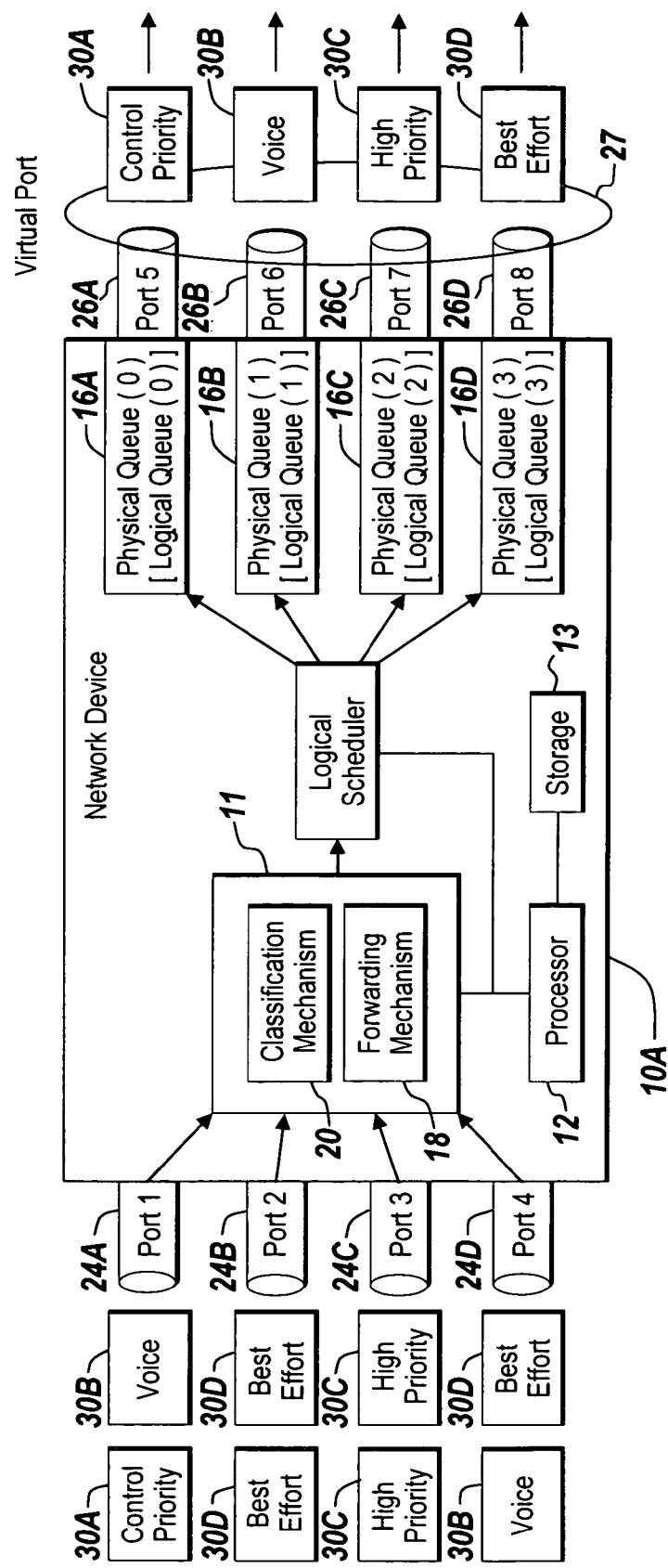
FIG. 1A illustrates a second exemplary apparatus suitable for use in practicing the illustrative embodiment of the present invention.

FIG. 1A illustrates another apparatus suitable for practicing an illustrative embodiment of the present invention. Network device 10A like network device 10 represents a network device suitable for performing OSI layer 2 data communications, OSI layer 3 data communications, OSI layer 4 to 7 data communications or data communications across and between other network layers of other network architectures. For example, network device 10A can be, but is not limited to, a bridge, a switch, a firewall, or a router.

FIG. 1A illustrates that the architecture and structure of the network device 10 is configurable to meet a desired configuration. That is, classification mechanism 20, forwarding mechanism 18, and logical scheduler 22 are well suited for use outside of the processor 12. As illustrated in FIG. 1A, the classification mechanism 20 and the forwarding mechanism 18 are configurable as a network traffic processing mechanism 11. The network traffic processing mechanism 11 performs receipt, classification, and forwarding of received network traffic. Moreover, those skilled in the art will appreciate that the classification mechanism 20, the forwarding mechanism 18, and the logical scheduler 22 are combinable as a single mechanism. In this manner, the classification mechanism 20, the forwarding mechanism 18, and the logical scheduler 22 can be included on several integrated components or on different circuit card assemblies within the network device 10A.

Figures 2, 3:
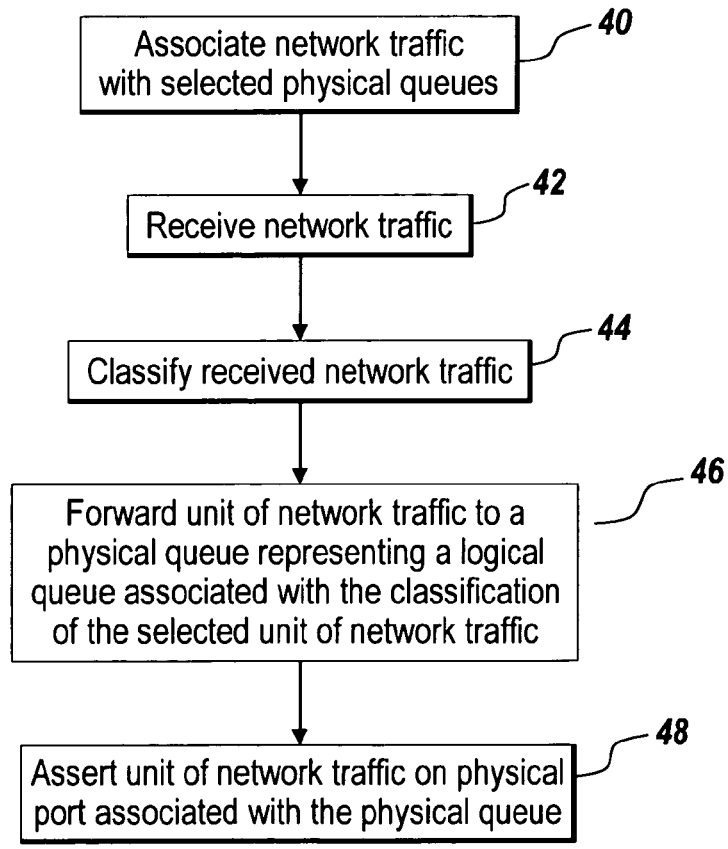
FIG. 2 illustrates an exemplary association of network traffic, logical queues, and physical queues according to the teachings of the present invention.
FIG. 3 illustrates steps taken to practice the illustrative embodiment of the present invention.

FIG. 2 illustrates an exemplary data structure suitable for holding the mapping between the logical queues and the physical queues of the network device 10, and hence the ports 26A-26D of the network device 10. The logical queue to physical queue mapping held by the data structure 28 provides a level of abstraction to the physical queues and physical ports. The appropriate physical queue for a selected unit of network traffic is identified by the forwarding mechanism 18 according to the logical queue to the physical mapping provided by the logical scheduler 22 and the class or classification of the unit of network traffic provided by the classification mechanism 20. As such, the physical queues are synonymous with a class or type of network traffic. This allows a system operator to associate different traffic classes to the various physical queues on each physical port or interface. Those skilled in the art will appreciate that the data structure 28 can take a number of forms including the LUT structure illustrated, a tree-like structure having a root node, and other like data structures.

FIG. 3 illustrates a block flow diagram depicting steps suitable for practicing the illustrative embodiment of the present invention. FIG. 3 is discussed in relation to the network device 10 illustrated in FIG. 1. In step 40, the network operator associates selected classes of network traffic handled by the network device 10 with selected physical queues of the network device 10 using the logical scheduler 22. That is, the network operator uses logical scheduler 22 to associate the physical queues (0-3) 16A-16D with the logical queues (0-3). In this manner, the forwarding mechanism 18 forwards selected network traffic based on classification of the network traffic to a port associated with the logical queue that is associated with the traffic class. The network operator can perform the mapping operations using the logical scheduler 22 via the interface 28. In step 42, the network device 10 receives network traffic on the network ports 24A-24D and, in step 44, the classification mechanism 20, processes the received network traffic to classify the units of network traffic according to defined criteria.

In accordance with the teachings of the present invention, selected units of network traffic received by the network device 10 are examined and classified by the classification mechanism 20 according to predefined criteria, for example, one or more CoS techniques or one or more classifications defined by the network operator. Those skilled in the art will recognize that the network device 10 is capable of parsing the received network traffic to identify an attribute in an appropriate field for use in classifying the received unit of network traffic. Moreover, those skilled in the art will recognize that network device 10 can further process selected units of network traffic to perform encapsulation, decapsulation, path look-up, address look-up, and other like processing matters. In step 46, forwarding mechanism 18 forwards a selected unit of network traffic from an input buffer to one of the physical queues (0-3) 16A-16B, for example physical 16A, according to the classification of the unit of network traffic and the logical queue to physical queue mapping held by the data structure 28. The forwarding mechanism 18 associates with the unit of network traffic forwarding information identifying a destination of the unit and a service level of the unit.

In step 48, network device 10 transmits the selected unit of network traffic on the port associated with the physical queue, for example port 26A, to the identified destination address at the identified service level for the selected unit of network traffic. Accordingly, network device 10 manages and controls network traffic according to one or more classes of network traffic over the virtual port 27 or other multiple port schemes such as trunking, hunt groups, and crossbar switching architectures. Those skilled in the art will appreciate that the illustrative embodiment of the present invention is adaptable to interface with and collaborate with other mechanisms in network device 10 to distribute, manage, and control network traffic according to one or more classes of network traffic. Such additional features and capabilities are discussed below in more detail with respect to FIGS. 4-6.

Figure 4:
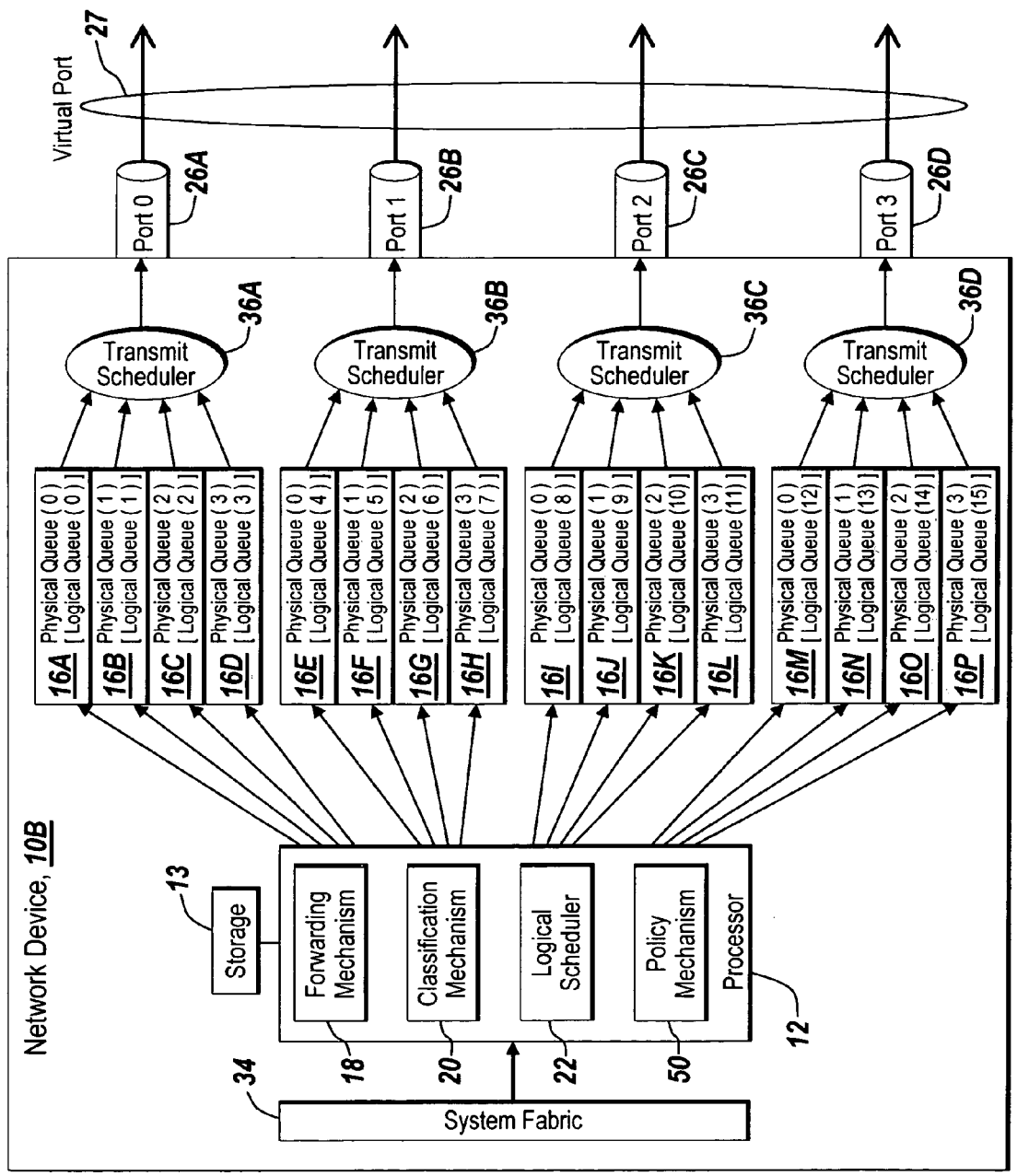
FIG. 4 illustrates another exemplary apparatus suitable for use in practicing an illustrative embodiment of the present invention.

FIG. 4 illustrates another embodiment of a network device that is suitable for practicing the present invention. Network device 10B, like network device 10 and 10A, illustrate that the virtual port 27 is adaptable to include a number of logical queues, for example logical queues (0-15), to satisfy a requirement or need to service and manage any number of classes of network traffic on a single interface. For example, as illustrated in FIG. 4, virtual port 27 and hence network device 10B is capable of managing and providing sixteen different classes of network traffic on virtual port 27. Network device 10B includes physical queues (0-15) 16A-16P and each physical port 26A-26D is configured to include four physical queues per port. As such, virtual port 27 has associated therewith more queues than are physically available on a per physical port basis. Network device 10B further illustrates that the network device described in connection with FIG. 1, can further include other mechanisms and features such as, transmit schedulers 36A-36D and policy mechanism 50. In accordance with the present invention, network device 10B is configurable to behave as if it has sixteen transmits queues representing sixteen classes of service for network traffic for the virtual port 27.

Network device 10B supports multiple transmit and receive queues per network interface and includes a system fabric 34, a policy mechanism 50, and transmit schedulers 36A-36D to add an additional level or levels of control to assist in the management and distribution of network traffic based on one or more predefined service rules or criteria. In this manner, network operators, network owners, or network administrators are capable of configuring network device 10B to support different queuing schedules and congestion avoidance parameters on a per interface basis. This enhances support for different types or classes of network traffic that have different service requirements and delay sensitivities. Network device 10B is well suited to support load balancing of network traffic over multiple physical ports while supporting different queue mappings for a subset of the device queues in a simultaneous or near simultaneous manner.

The system fabric 34 can provide network device 10B with a fast internetwork connection between devices. System fabric 34 can include a number of receive queues (not shown) to temporary store received network traffic and if desired the system fabric 34 can examine and classify each unit of received network traffic according to pre defined criteria before forwarding a selected unit of network traffic to the forwarding mechanism 18.

Logical queues (0-15) are mapped for illustrative purposes in the following manner. Logical queues (0-3) are mapped to physical queues (0-3) 16A-16D, respectively, of physical port 26A. Logical queues (4-7) are mapped to physical queues (0-3) 16E-16H, respectively, of physical port 26B. Similarly, logical queues (8-11) are mapped to physical queues (0-3) 16'-16L, respectively, of physical port 26C. Further, logical queues (12-15) are mapped to physical queues (0-3) 16M-16P, respectively, of physical port 26D. In this manner, virtual port 27 represents sixteen classes of network traffic managed by network device 10B.

Transmit schedulers 36A-36D are adaptable to suit the needs of the network provider, network operator or network administrator. For example, each of the transmit schedulers 36A-36D is configurable to provide a number of transmission modes. That is, each of the transmit schedulers 36A-36D can transmit network traffic from each physical queue 16A-16P in a sequential manner so that, for example, the transmit scheduler 36A transmits the network traffic in physical queue 16A until physical queue 16A empties and then transmits network traffic from the physical queue 16B until empty, and then transmit network traffic from the physical queue 16C until empty, and then transmit network traffic from the physical queue 16D until empty and then begins again with the physical queue 16A. In this manner, the network operator, the network owner, or the network administrator can define a number of output traffic streams and after all the packets or data units in a first stream are transmitted, control is passed to the next defined stream in the sequence.

Moreover, those skilled in the art will appreciate that one or more of the transmit schedulers 36A-36D are adaptable to transmit the network traffic in such a manner that satisfies an aggregate rate by scheduling a set of data units for transmission on a selected port, and thus creating a transmission pattern with a mixture of data units with variable rates while meeting or satisfying defined service rules for network traffic. Furthermore, those skilled in the art will appreciate that the transmit schedulers 36A-36D are configurable to work independently of one another. In similar fashion, those skilled in the art will appreciate that the transmit schedulers 36A-36D are configurable to work in a cooperative manner with each other.

Policy mechanism 50, which can be located within the processor 12 or outside of the processor 12, is configurable to police the physical queues 16A-16P in terms of input and output rate and depth. According to information from the policy mechanism 50, and if desired information from another policy mechanism such as a policy database, rules database, a policy based protocol, and the like, the network device 10B can change an association of a physical queue and a logical queue using the logical scheduler 22, and can modify the operation of one or more of the transmit schedulers 36A-36D. Such modifications include, but are not limited to holding a physical queue in reserve, flushing a selected physical queue, and the like. Other information suitable for use by the network device 10B in determining a mapping provided by the logical scheduler 22 and the operation of one or more of the transmit schedulers 36A-36D include factors such as how much data is sent or held in a selected physical queue, a rate of fill or rate of drain of a selected physical queue, a link status associated with a selected physical queue, reserved bandwidth for a selected physical port, and the like.

FIG. 5 illustrates an exemplary data structure suitable for holding the mapping between the logical queues and the physical queues of the network device 10B. The logical queue to physical queue mapping held by the data structure 28A provides a level of abstraction to the physical queues and physical ports. The appropriate physical queue for a selected unit of network traffic is identified by the forwarding mechanism 18 according to the logical queue to physical mapping provided by the logical scheduler 22 and the class or classification of the unit of network traffic provided by the classification mechanism 20. As such, the physical queues are synonymous with a class or type of network traffic. This allows, a system operator to associate different traffic classes to the various physical queues on each physical port or interface forming a virtual port (i.e., virtual port 27). Those skilled in the art will appreciate that the data structure 28A can take a number of forms including the LUT structure illustrated, a tree-like structure having a root node, and other like data structures.

The data structure 28A further illustrates the ability of the present invention to provide a network device that behaves as if it has sixteen transmit queues representing sixteen classes of service for network traffic on one port. According to the data structure 28A, network traffic classified as belonging to one of the logical queues (0-3) are mapped to port 0's physical queues (0-3), respectively. Network traffic classified as belonging to one of the logical queues (4-7) are mapped to port 1's physical queues (0-3), respectively. Likewise, network traffic classified as belonging to one of the logical queues (8-11) are mapped to port 3's physical queues (0-3), respectively. Similarly, network traffic classified as belonging to one of the logical queues (12-15) are mapped to port 4's physical queues (0-3), respectively. In this manner, the network device 10B can transmit multiple like classes of network traffic in a simultaneous or near simultaneous manner.

Figure 6:
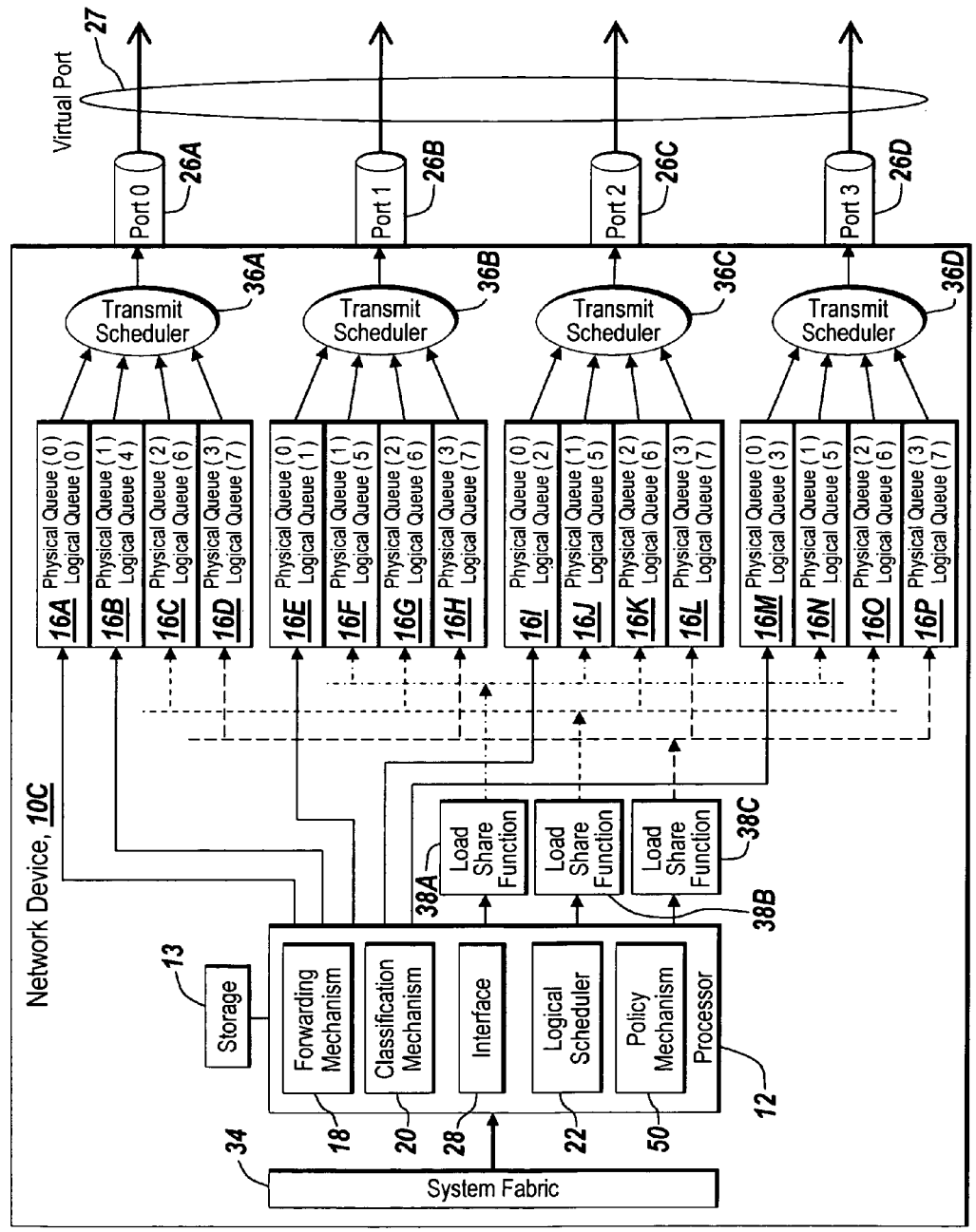
FIG. 6 illustrates a further exemplary apparatus suitable for practicing the illustrative embodiment of the present invention.

FIG. 6 illustrates a further embodiment of the illustrative network device according to the teachings of the present invention. Network device 10C illustrates the application of multiple interface network traffic load balancing in conjunction with the class of network traffic management features of the present invention. Network device 10C further illustrates the ability of the present invention to support multiple equal, but different, expedited forwarding classes of network traffic. As such, the network device 10C is capable of using both class based network traffic forwarding and multiple interface network traffic load balancing to transmit multiple equal but different classes of network traffic simultaneously or nearly simultaneously.

To accomplish the multiple interface network traffic load balancing, the network device 10C includes load share functions 38A-38C. Those skilled in the art will appreciate that the load share functions 38A-38C can include one or more software modules, one or more hardware modules, or a combination of hardware and software modules. The virtual port 27 of the network device 10C is configured to include eight logical queues (0-7) to provide the network device 10C with the ability to support eight classes of network traffic according to predefined service rules or criteria. The physical ports 26A-26D are grouped as the virtual port 27, and thus, as illustrated in FIG. 6 the network device 10C is configurable to behave as if it has sixteen transmits queues representing up to sixteen classes of network traffic for transmission across the virtual port 27. In other words, the virtual port 27 has more queues than the number of queues available on one of the ports 26A-26D.

Network device 10C illustrates the ability of the present invention to support four unique "expedited traffic" classes of network traffic, three unique "assured traffic" classes, and a "best effort" class of traffic. Each unique "expedited traffic"

class of network traffic is assigned or mapped to logical queues (0-3). FIG. 7 depicts an illustrative mapping of logical queues to physical queues for network device 10C. For illustrative purposes, expedited "control class" traffic is mapped to logical queue (0), expedited "Class A" traffic is mapped to logical queue (1), expedited "Class B" traffic is mapped to logical queue (2), and expedited "Class C" traffic is mapped to logical queue (3).

Network device 10C further supports three unique "assured" classes of network traffic, assigned to logical queues (4-6). For illustrative purposes, assured "Class 1" traffic is mapped to logical queue (4), assured "Class 2" traffic is mapped to logical queue (6), and assured "Class 3" traffic is mapped to logical queue (7). Network device 10C further supports a "best effort" class of network traffic. The best effort traffic is assigned to logical queue (5).

To illustrate the ability of the present invention to support multiple expedited classes of network traffic, logical queue (0) is mapped to physical queue 16A of physical port 26A, logical queue (1) is mapped to physical queue 16E of physical port 26B, logical queue (2) is mapped to physical queue 16I of physical port 26C, and logical queue (3) is mapped to physical queue 16M of physical port 26D. In this manner, network device 10C avoids port contention for the four classes of expedited traffic for each class of expedited traffic is placed on separate ports for transmission to the appropriate destination point in a network.

In similar fashion to the expedited classes of network traffic the three classes of assured network traffic are mapped in the following manner. Assured "Class 1" traffic is mapped to logical queue (4), which is mapped to physical queue 16B of physical port 26A. Logical queue (6) is mapped to load share function 38B, which, in turn, is mapped to physical queue 16C of physical port 26A, physical queue 16G of physical port 26B, physical queue 16K of physical port 26C, and physical queue 16O of physical port 26D to load share assured "Class 2" network traffic across physical ports 26A-26D. In like fashion, logical queue (7) is mapped to load share function 38C which, in turn, is mapped to physical queue 16D of physical port 26A, to physical queue 16H of physical port 26B, to physical queue 16L of physical port 26C, and to physical port 16P of physical 26D to load share assured "Class 3" network traffic across physical ports 26A-26D.

The "Best Effort" class of network traffic is mapped to logical queue (5), which is mapped to load share function 38A, which, in turn is mapped to physical queue 16F of physical port 26B, to physical queue 16J of physical port 26C, and to physical queue 16N of physical port 26D.

As mentioned above, network device 10C illustrates the ability of the present invention to operate in conjunction with conventional load balancing mechanisms, such as load share functions 38A-38C. In this manner, network traffic assigned to logical queues (5-7) are load balanced across physical ports 26A-26B while the network device 10C preserves support for multiple equal, but different expedited classes of network traffic. Those skilled in the art will recognize that load share functions 38A-38C are mappable to any of the physical queues and that the mapping of physical queues and logical queues discussed herein is merely meant to facilitate explanation of the present invention and are not meant to limit the present invention to a particular mapping or association.

Network device 10, and its various embodiments, provides a significant benefit to the management of network traffic in that it allows for a more diverse array of network traffic management configurations. Conventional network devices typically include an interface that supports a limited number of scheduler configurations. Nonetheless, the present invention provides a virtual interface having a number of logical queues associated with selected classes of network traffic. This allows network device 10, or any embodiment of network device 10, to handle classes of network traffic on a per class basis and if desired to treat each class in a like manner or in a different manner through, for example, transmit schedulers on a per interface basis.

Figure 8:
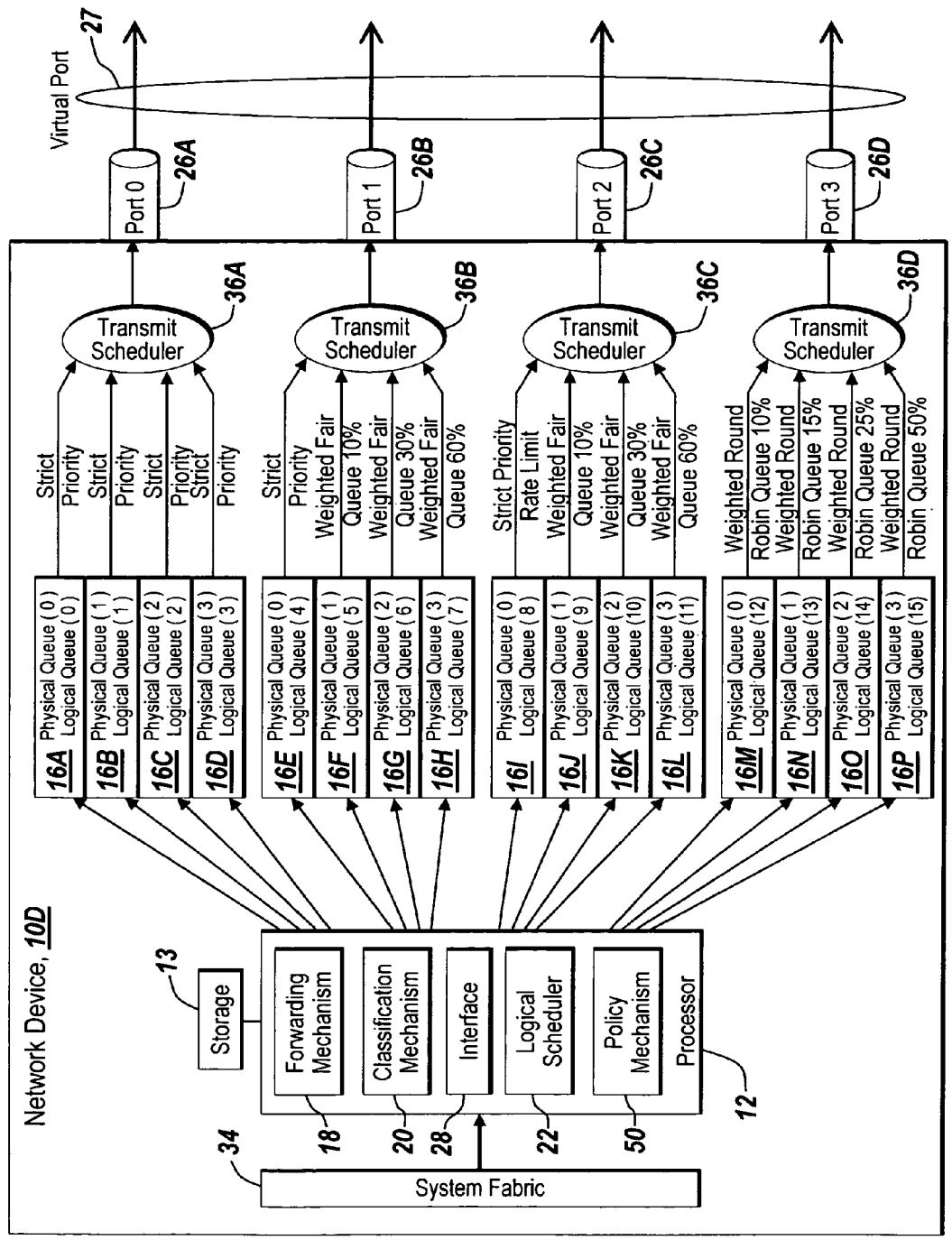
FIG. 8 illustrates a further exemplary apparatus suitable for practicing the illustrative embodiment of the present invention.

FIG. 8 illustrates a further embodiment of the network device 10. Network device 10D illustrates a network device in accordance with the present invention is adaptable to support a variety of scheduler configurations on a per port basis. As such, the transmit scheduler 36A is configured to place network traffic from the physical queues 16A-16D on the physical port 26A using a strict priority queuing technique or methodology. The transmit scheduler 36B is configured to place network traffic from the physical queue 16E on the physical port 26B using a strict priority queuing technique or methodology. The transmit scheduler 36B is further configured to place network traffic from the physical queues 16F-16H on the physical port 26B using a weighted fair queuing methodology. For example, network traffic associated with the physical queue 16H is allotted sixty percent of the available bandwidth of the physical port 26B by the transmit scheduler 36B. In similar fashion, network traffic associated with the physical queue 16G is allotted thirty percent of the available bandwidth of the physical port 26B by the transmit scheduler 36B while the network traffic associated with the physical queue 16F is allotted ten percent of the available bandwidth of the physical port 26B by the transmit scheduler 36B.

Likewise, the transmit scheduler 36C is configured to place the network traffic from the physical queue 16I on the physical port 26C using a strict priority queuing methodology configured with a rate limiter applied while the network traffic from the physical queues 16J-16K are placed on the physical port 26C by the transmit scheduler 36C using various weighted fair queuing percentages. The transmit scheduler 36D is configured to place the network traffic from the physical queues 16M-16P on the physical port 26D using various weighted round robin queuing methodology. For example, the scheduler 36D places a weight on each of the physical queues 16M-16P to serve a different number of bytes or packets from the queues during a round-robin cycle.

Those skilled in the art will appreciate that each of the transmit schedulers 36A-36B are further configurable as, for example, a deficit round robin scheduler, or configurable to apply various rate limits or rate shapers to individual classes of network traffic dependent upon which output port or output interface and physical queue the individual class of network traffic is directed to.

The present invention provides a significant benefit over conventional approaches to network traffic management across a link aggregated interface, for example the virtual port 27. That is, the present invention allows for transmission of more than one "highest priority" class of network traffic between network devices in a network environment. In contrast, conventional network devices are limited to managing and forwarding one highest priority level of network traffic no matter how many physical queues per physical interface are available on the network device, because more than one highest priority level class of network traffic in conventional devices can be destructive of each other when transported through the same physical interface and physical queue of a network device. The present invention, however, allows a network operator, network provider, or network administrator to realize a new "highest priority" level or class of network traffic each time a physical interface or port is added to the virtual port 27 without introducing destructive tendencies (e.g. resource contention or dropped units of network traffic). Hence, the present invention facilitates the transport of multiple network traffic streams each classified as belonging to equal but different highest priority classes of equally highest priority.

For example, in a network environment where voice, video, and storage traffic are transported, each type of such network traffic is transported in different sized data units. Voice data is typically transported via what is considered small network packets. Video data is typically transported with what is considered medium size frames, while storage data is transported with what is considered very large or jumbo frames. Nevertheless, all three types of network traffic are sensitive to network induced jitter. Consequently, if all three types of network traffic are transported through the same physical interface and physical queue of a conventional network device, the relatively smaller voice frames often experience an uneven distribution when being interleafed with the relatively jumbo size storage frame and the medium size video frames. Accordingly, the present invention allows the network operator to assign each type of network traffic, such as video traffic, storage traffic and voice traffic to a respective "highest priority" physical queue associated with a respective physical port, thus insuring minimal induced jitter and lowest transport delay for each highest priority class of network traffic.

Moreover, the present invention further solves a network traffic distribution problem often associated with convergence environments. Often, network operators, network providers, and system administrators need to decide which type of network traffic is the more important traffic type to transport on the network, for example, real time payload traffic or communications control traffic. Both types of network traffic are critical to the operation of convergence applications. Nevertheless, the present invention allows both payload network traffic and control protocol network traffic to be assigned to dedicated "highest priority" physical queues and thus insuring the availability of both real time payload traffic and communications central traffic on the network.

Those skilled in the art will recognize that a number of multiple port link aggregation methodologies and technologies implemented in network devices may use a single port in the link bundle for the purpose of flooding the network with broadcast data units, multicast data units, and data units destined to unknown destination (MAC) addresses. The present invention allows for the selection of a single port in the link aggregation group as well as an associated logical queue and physical queue for the distribution of "flooded" data units across the virtual port 27. That is, the network device 10 and any embodiments thereof do not require or restrict "flooded" data units to a specific physical port and associated physical queue, but rather is adaptable so that a network operator, network owner, or system administrator can choose one or more physical ports and associated physical queues to flood the network with "flooded" data units, as desired.

Figure 9A:
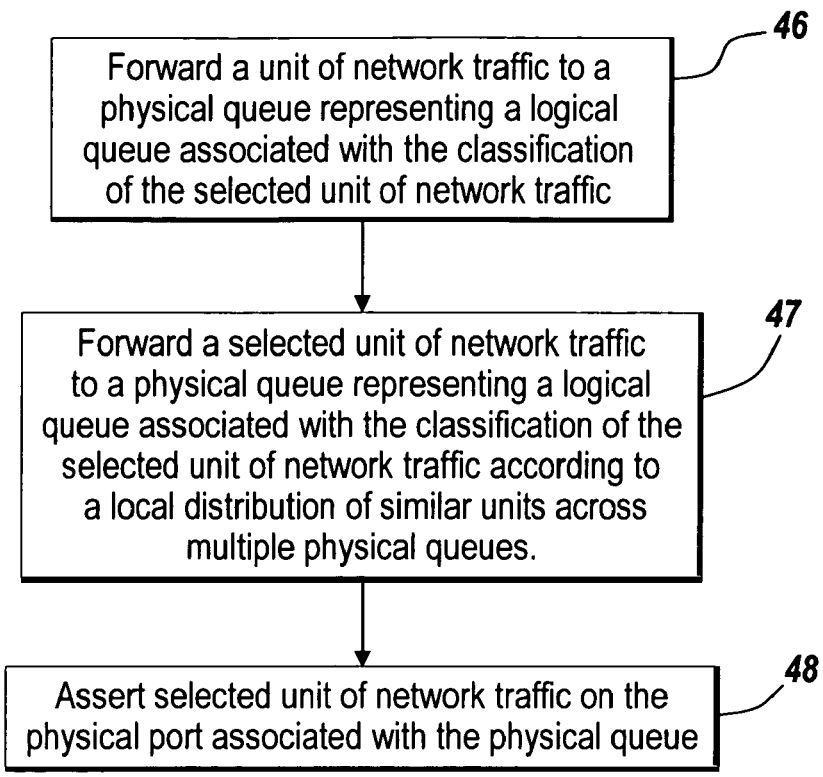
FIG. 9A illustrates additional steps capable of being taken by a network device in accordance with the teachings of the present invention to manage network traffic associated therewith.
Figure 9B:
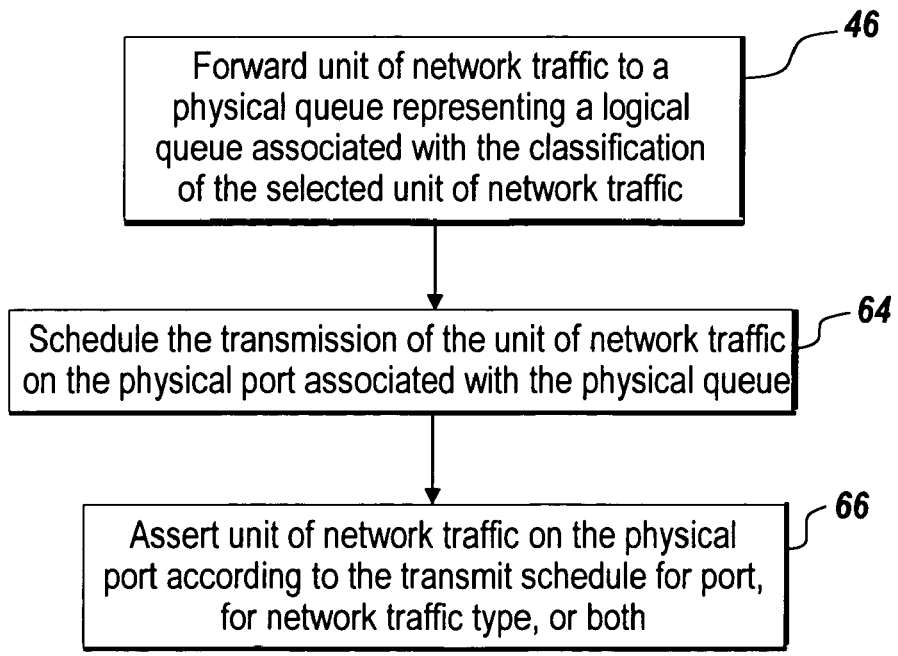
FIG. 9B illustrates additional steps capable of being taken by a network device in accordance with the teachings of the present invention to manage network traffic associated therewith.
Figure 9C:
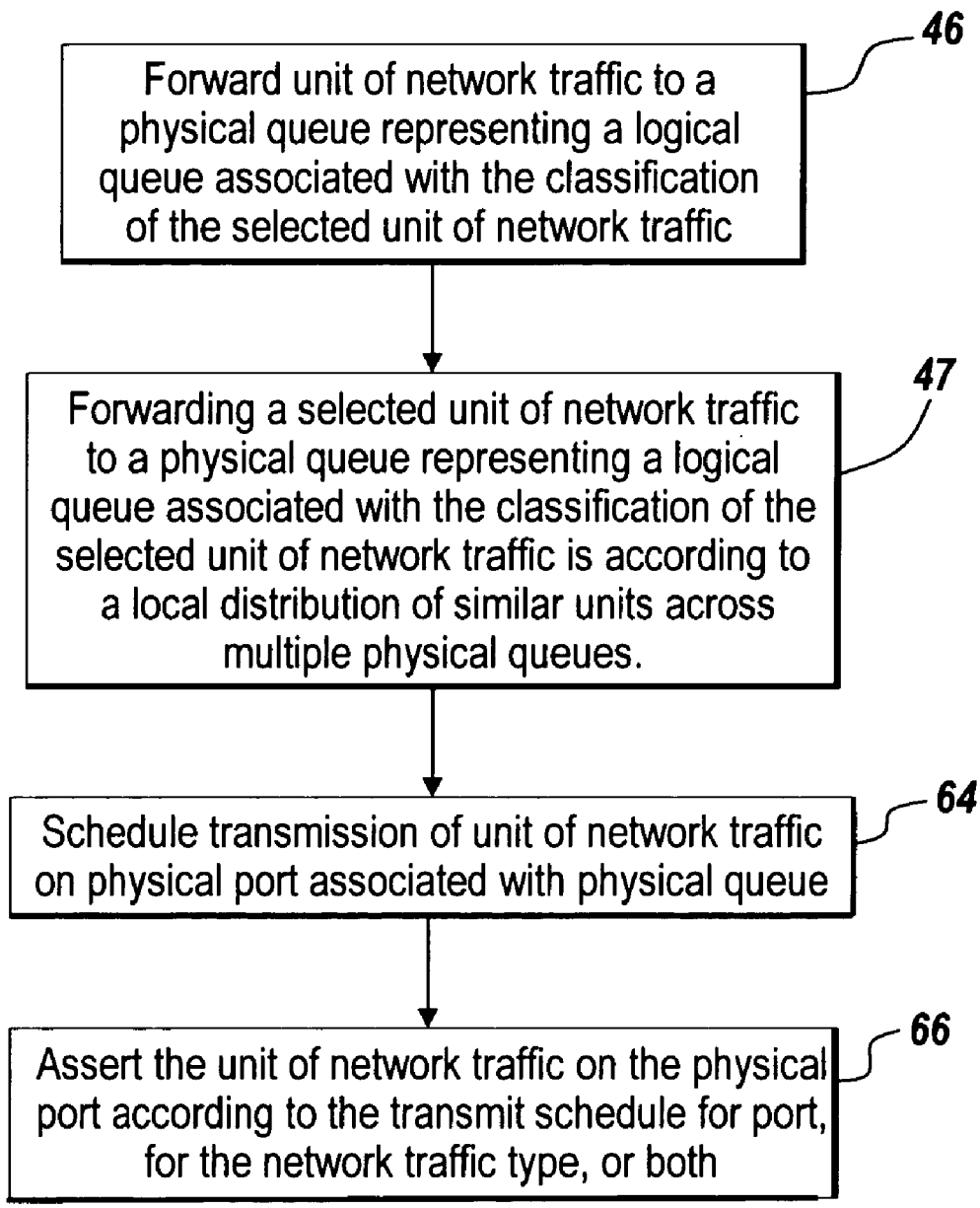
FIG. 9C illustrates additional steps capable of being taken by a network device in accordance with the teachings of the present invention to manage network traffic associated therewith.

FIGS. 9A-9C illustrate the steps taken by the additional network traffic management features described with respect to FIGS. 4-8.

FIG. 9A illustrates the step 46 from FIG. 3 in more detail. FIG. 9A illustrates that a network device in accordance with the present invention is adaptable to interface with and collaborate with other mechanisms, such as the load share functions 38A-38C in network device 10C to distribute, manage, and control network traffic according to one or more classes of network traffic. As such, in step 47, the network device 10C forwards a selected unit of network traffic from an input buffer (not shown) to a physical queue representing a logical queue associated with the classification of the selected unit of network traffic according to a load distribution of similar units across multiple physical queues representing the logical queue. For example, one or more of the load share functions 38A-38C described in detail above with relation to FIG. 6 is capable of balancing the distribution of the selected units of network traffic across multiple physical queues representing a logical queue. Those skilled in the art will appreciate that the load share functions 38A-38C are configurable to provide a distribution of selected units of network traffic across the multiple physical queues according instructions from a network operator to achieve a desired balancing of traffic across the physical queues. In step 48, the network device 10 transmits the selected unit of network traffic from the physical port associated with the physical queue identified by the load balancing mechanism.

FIG. 9B further illustrates step 46 in FIG. 3 in more detail. FIG. 9B illustrates that a network device in accordance with the present invention is adaptable to interface with and collaborate with other mechanisms, such as the transmit schedulers 36A-36D in the network device 10B or the network device 10C or the network device 10D to distribute, manage, and control network traffic according to one or more classes of network traffic. As such, in step 64, one of the transmit schedulers 36A-36D schedules transmission of a selected unit of network traffic on a physical port associated with the physical queue representing the logical queue associated with the classification of the selected unit of network traffic. For example, the transmit scheduler 36A schedules placement of network traffic forwarded to the physical queues 16A-16D on the physical port 26A using one or more strict priority methodologies. Other examples of per port scheduling supported by the present invention are described above with relation to FIG. 8. Moreover, in step 66, the network device 10, or any embodiment thereof, asserts or transmits the unit of network traffic on the physical port according to the transmit schedule for the physical port, the transmit schedule for the classification of the unit of network traffic, the transmit schedule for the physical port, or any combination thereof. In this manner, the network device 10, or any embodiments thereof can restrict transmission of selected units of network traffic from the ports 26A-26D by applying one or more policing or traffic shaping restrictions to network traffic on any of the ports 26A-26D.

Additionally, the configuration of the network device 10, or any embodiment thereof, can include the transmission rate schedulers 36A-36D, or the load share functions 38A-38C, or both, to allow the network device in accordance with the teachings of the present invention to rate control selected units of network traffic by performing, for example, burst shaping on the selected units of network traffic. In this manner, the network device 10 is capable of permitting traffic bursts of a predetermined size to present a burst regulated stream of network traffic to the network environment associated with the network device 10. Alternatively, the network device 10, or any embodiment thereof, can rate limit selected units of network traffic on a per class basis. For example, the network device 10 is adaptable to allow two Mbps of network traffic classified with a gold DIFF SERV attribute, five Mbps of network traffic having a silver DIFF SERV attribute, and an unlimited amount of network traffic having a bronze DIFF SERV attribute. Other rate limiting capabilities of network device 10 can be based on a layer 4 profile within the virtual port 27, for example, network device 10 can allow an unlimited amount of subscriber HTTP traffic, but rate limit NNTP traffic to some bandwidth threshold. Nevertheless, those skilled in the art will recognize that network device 10, or any embodiment thereof, is capable of rate limiting traffic based on other methodologies and technologies and other traffic policing tools to control bandwidth and prioritize transmission of network traffic based on specific subscriber or application requirements.

FIG. 9C illustrates step 46 from FIG. 3 in more detail. FIG. 9C illustrates that a network device in accordance with the present invention is adaptable to interface with and collaborate with other mechanisms, such as the load share functions 38A-38C and the transmit schedulers 36A-36D to distribute, manage, and control network traffic according to one or more classes of network traffic. As such, in step 47, the network device according the teachings of the present invention forwards a selected unit of network traffic from an input buffer (not shown) to a physical queue representing a logical queue associated with the classification of the selected unit of network traffic according to a load distribution of similar units across multiple physical queues representing the logical queue. In step 64, one of the transmit schedulers 36A-36D schedules transmission of the selected unit of network traffic on a physical port associated with the physical queue representing the logical queue associated with the classification of the selected unit of network traffic. In step 66, the network device 10, or any embodiment thereof, asserts or transmits the selected unit of network traffic on the physical port according to the transmit schedule for the physical port, the transmit schedule for the classification of the unit of network traffic, the transmit schedule for the physical queue or any combination thereof.

Figure 10:
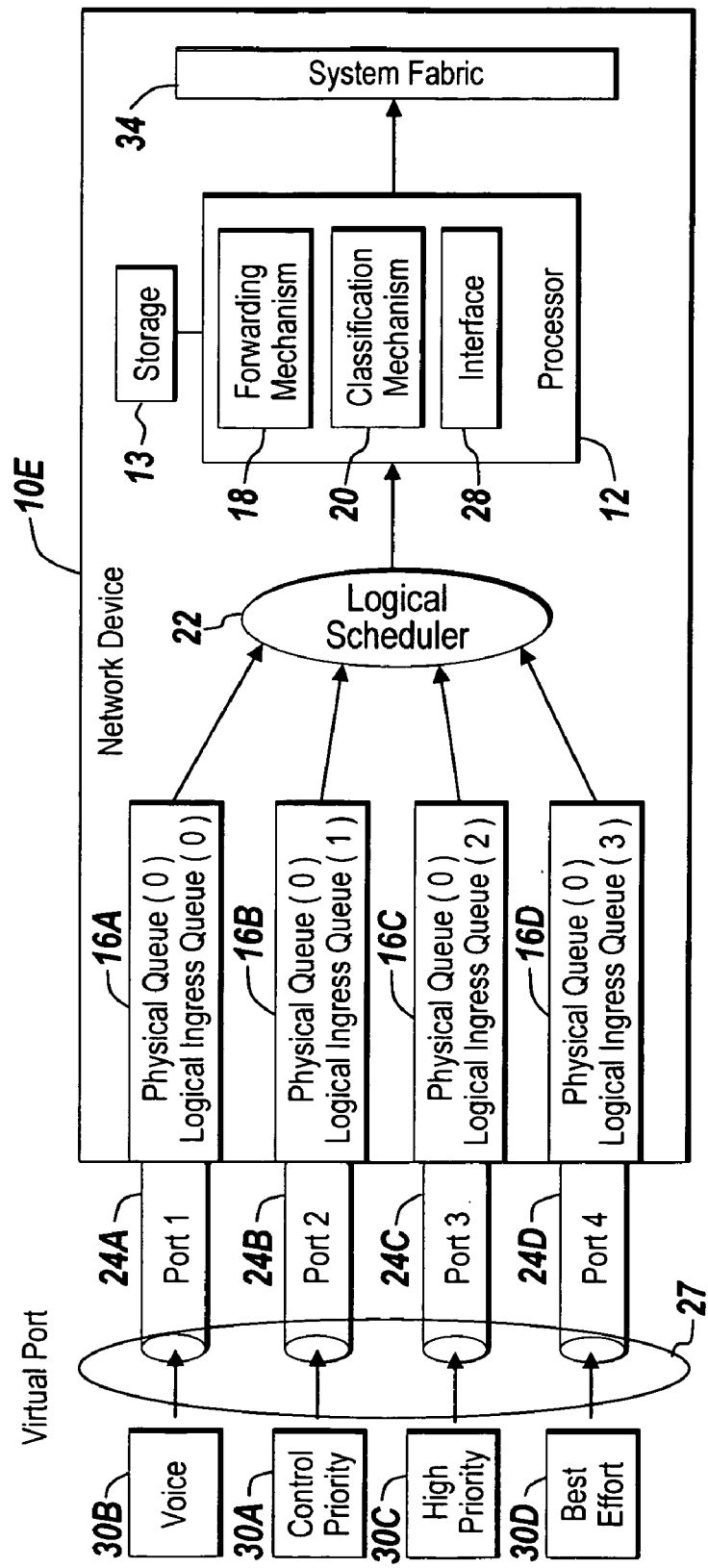
FIG. 10 illustrates a further exemplary apparatus suitable for practicing the illustrative embodiment of the present invention.

The teachings of the present invention are equally applicable to the input ports of the network device 10, or any embodiment thereof, to provide for ingress path prioritization. FIG. 10 illustrates the network device 10E configured according to the teachings of the present invention to provide ingress path prioritization. For example, in accordance with the teachings of the present invention, when two network devices are connected by an aggregated link for distribution of network traffic based on one or more service rules or models, the network device receiving network traffic across the aggregated link is configurable to perform ingress path prioritization. That is, the network device 10E receives network traffic on the ingress ports 24A-24D and can prioritize and classify received network traffic on a selected port as a higher, lower, or equal priority as compared to other network traffic received on another port to provide ingress prioritization. Consequently, the ability of the network device 10E to provide ingress prioritization on network traffic assists in alleviating congestion at the forwarding mechanism 18 and the classification mechanism 20 or congestion at the device fabric 34.

Figure 11:
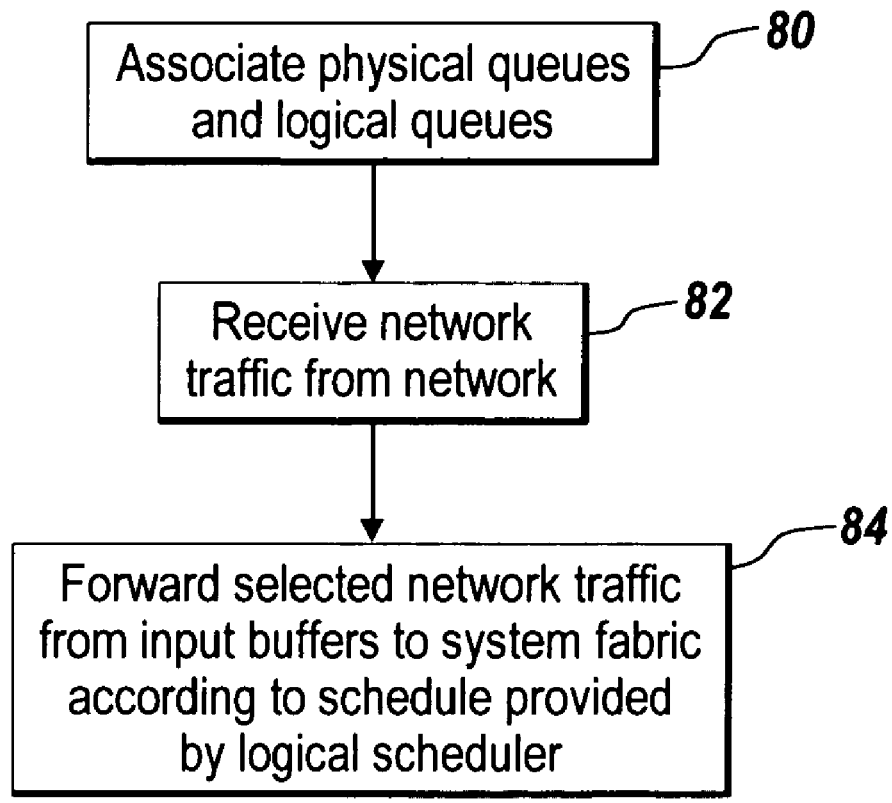
FIG. 11 illustrates steps taken by the apparatus in FIG. 10 to practice an illustrative embodiment of the present invention.

FIG. 11 illustrates a block flow diagram suitable for providing ingress path prioritization using the input ports of the network device 10E in accordance with the present invention. In step 80, the network operator, network owner, or system administrator associates the input physical queues 16A-16D of each respective input port 24A-24D with the logical queues (0-3). In step 82, the network device 10E receives network traffic via the virtual port 27 from another network device in the network across a link aggregation group. In step 84, selected network traffic is forwarded from the input physical queues 16A-16D to the system fabric 34 according to a schedule provided by the logical scheduler 22.

As such, the network device 10E is configured to schedule the servicing of network traffic received via the virtual port 27 based on a priority weighting per interface. For example, as illustrated, the port 24A receives a "voice" class of network traffic 30B or a high priority unit of network traffic transmitted by another network device associated with the link aggregation group of virtual port 27. In like fashion, the port 24D receives a "best effort" class of network traffic 30D, the lowest priority of network traffic transmitted from the other network device across the virtual port 27. The port 24B receives a "control priority" class of network traffic 30A, conceivably the highest possible class of network traffic and therefore of the highest priority. The port 24C receives a "high priority" class of network traffic 30C, which can represent a medium priority unit of network traffic transmitted from the other network device associated with the virtual port 27.

Thus, in step 86, the network device 10E forwards a selected unit of network traffic, for example, the network traffic 30B, from an input physical queue represented by a logical queue associated with the classification of the selected unit of network traffic, for example, "voice" traffic received on the input port 24A to the device fabric 34 for further processing and handling.

The ability of the network device 10E, or any embodiment thereof, to provide ingress path prioritization allows for an improvement in the quality and reliability of the transmission of highest priority network traffic even when the network device 10E is experiencing network traffic congestion. That is, if the network device 10E is experiencing network traffic congestion, the network device 10E can service the "control priority" network traffic received on the port 24B first, the "voice" network traffic received on the port 24A second, the "high priority" network traffic received on the port 24C third, and the "best effort" network traffic received on the port 24D last. Those skilled in the art will recognize that for the network device 10E to realize such a benefit, it is helpful that the transmitting network device be configured to classify network traffic on output ports in correlation with the class of traffic network device 10E expects to receive on an input port. That is, the output port of the sending network device corresponding to the port 24A of the network device 10E transmits network traffic classified as "voice" traffic, the output port of the sending network device corresponding to the port 24D outputs network traffic of the lowest priority and, the two output ports of the sending network device corresponding to the ports 24B and 24C transmit units of the network traffic classified as "control priority" and "high priority", respectively. Transmission of the network traffic in this manner helps ensure the proper prioritization of network traffic between two network devices. One suitable application for such a configuration is between two crossbar switches to alleviate problems often associated with network congestion and to ensure prioritization between the two crossbar switches.

In addition to features described above, a network device in accordance with the teachings of the present invention supports multiple failure recovery schemes to protect, for example, high priority or essential classes of network traffic in the event of a failure of a physical interface or a module in the network device 10 that contains one or more interfaces making up a multiple port interface or two or more ports forming a link aggregated group. The failover and recovery schemes described below in more detail are also well suited for use in the event of a failure in a transmission medium coupled to one of the ports. Those skilled in the art will recognize that because it is possible for each physical interface of a network device to have a different number of physical queues available for use in temporarily storing network traffic, the failure of one physical interface or port can likely impact the preservation of high priority network traffic throughout the network environment. Fortunately, the illustrative embodiment of the present invention provides a number of methods to address the preservation of high priority network traffic in the event of a physical interface failure, such as a network interface card (NIC) failure in the network device 10, or any embodiment thereof, or the failure of an associated transmission medium, for example a cable, a wire, an optical filter, or an antenna. The illustrative embodiment of the present invention provides at least two failure recovery methods, although those skilled in the art will recognize that other failure recovery methods are well suited for use in the network device 10.

Figure 12A:
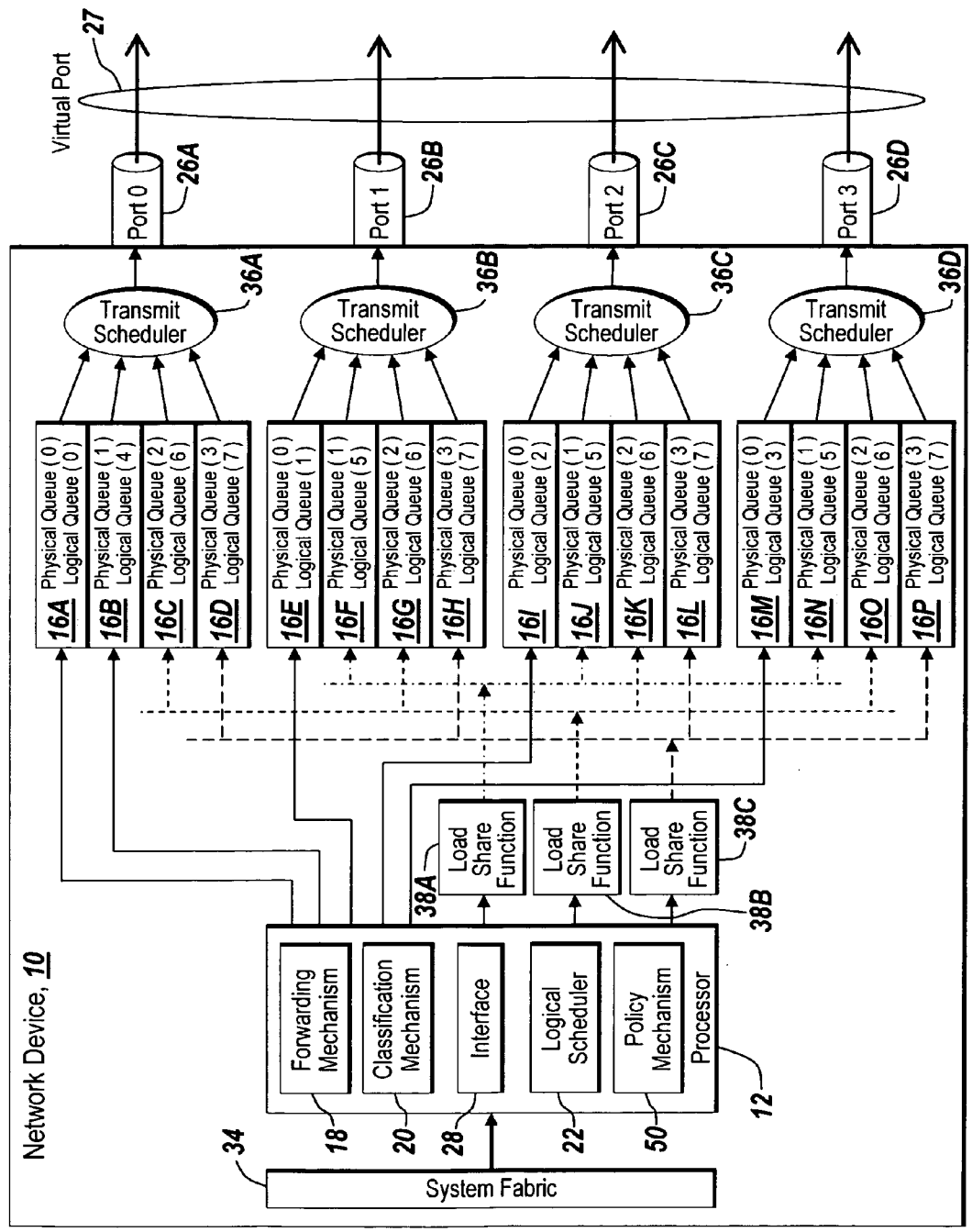
FIG. 12A illustrates an exemplary apparatus suitable for practicing an illustrative embodiment of the present invention before detection of an error that affects network traffic managed by the apparatus.
Figure 12B:
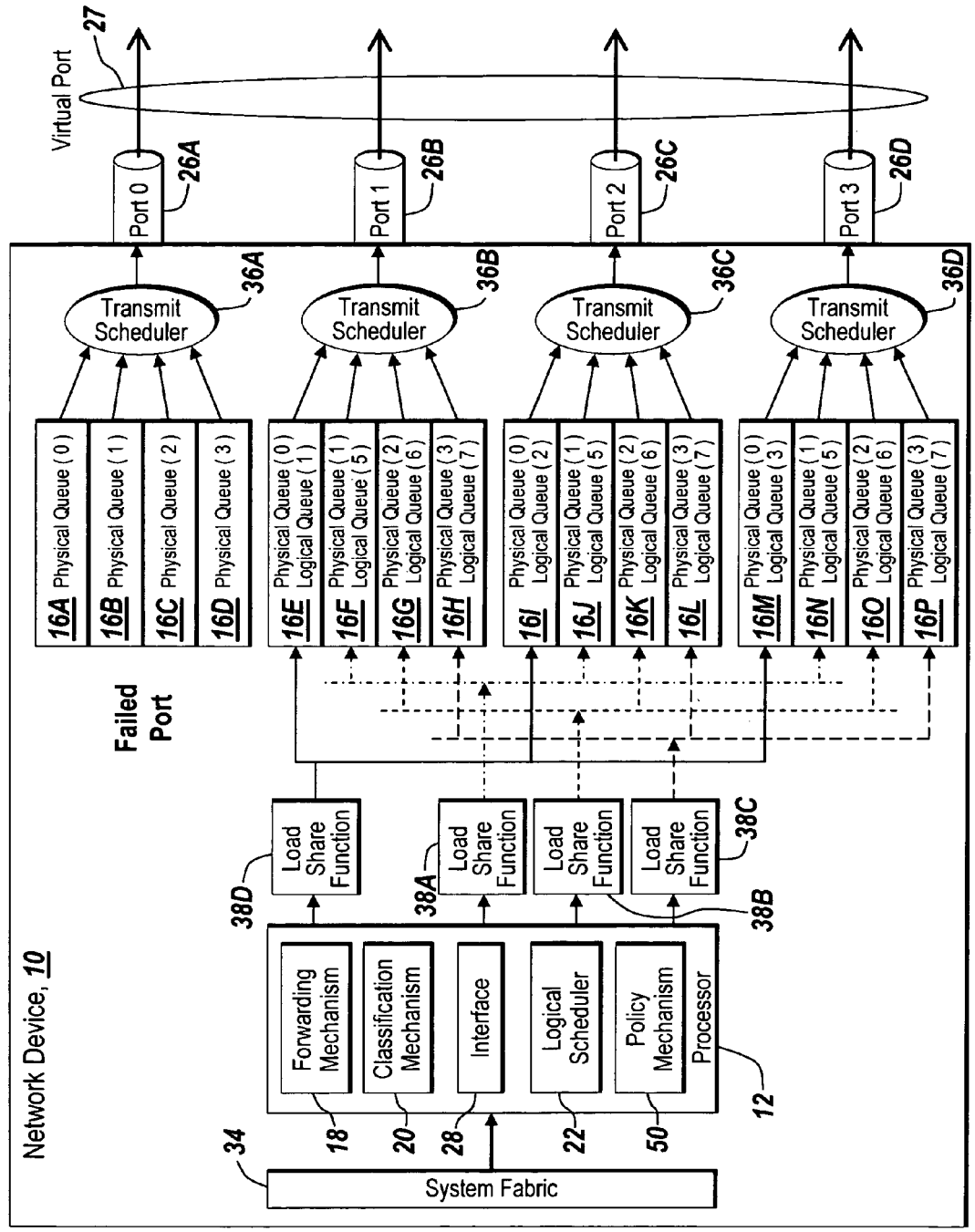
FIG. 12B illustrates the exemplary apparatus of FIG. 12A after detection of the error that affects management of network traffic in the illustrative apparatus suitable for practicing the present invention.
Figure 13A:
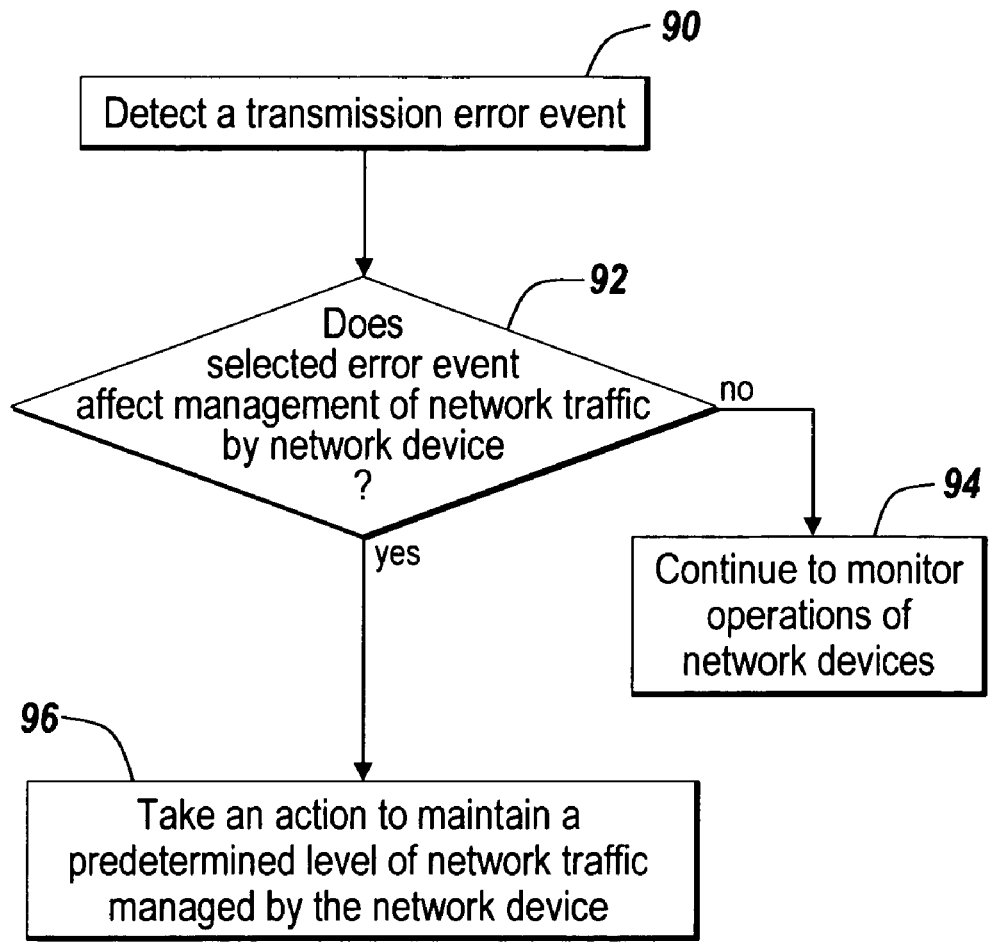
FIG. 13A illustrates steps taken upon detection of an error condition in the illustrative apparatus of the present invention.

FIG. 12A illustrates the network device 10 prior to the detection of a failure that affects transmission of network traffic on a physical output port. FIG. 12B illustrates the network device 10 after detection of an event that affects transmission of network traffic on an output port and implementation of a response mechanism to address the detected event in accordance with the present invention. FIG. 13A illustrates a block flow diagram depicting steps taken by the network device 10, or any embodiment thereof, upon detection of an event that affects transmission of network data on a port of the network device 10. One suitable response mechanism is discussed below in relation to FIGS. 12A, 12B, and 13A.

In FIG. 12A, the network device 10, as described above in relation to FIG. 6 forwards and manages network traffic across virtual port 27 according to an association of the physical queues 16A-16P to the classes of network traffic handled by the network device 10 as represented by the logical queues (0-7) in this illustrative embodiment of the present invention. As illustrated in FIG. 12A the number of the logical queues (0-7) represented by the virtual port 27 exceeds the number of physical queues (0-3) available on any one of the physical ports 26A-26D. As such, the failure of a single physical port on the network device 10 can impact the preservation of high priority network traffic throughout the network.

In accordance with the illustrative embodiment of the present invention, in step 90, the network device 10 detects a transmission error event by, for example, reading a status register, detecting a time out or other suitable means for identifying a transmission error event within the network device 10. In step 92, the network device 10 indicates whether the detected error event affects management or transmission of network traffic by the network device 10. If, in step 92, the determination indicates that the detected error event does not affect management of network traffic, the network device 10 proceeds to step 94 and continues to monitor operations for an increase in the severity of the detected event or a new error event. Those skilled in the art will appreciate that an increase in the severity of the detected event includes such conditions as a reoccurrence of the event after a selected period of time, detection of the event by other network devices, detection of other events that relate in some manner to the initially detected event, or other like indicators.

If, in step 92, the determination indicates that the detected error event affects management or transmission of network traffic by the network device 10, the network device 10 proceeds to step 96 where an action is taken to maintain a predetermined level of network traffic managed by the network device 10.

FIG. 12B depicts the network device 10 after determination of an error event that affects transmission of network traffic and the taking of an appropriate recovery action to maintain a predetermined level of network traffic managed by network device 10. Such an event can correlate to a failed hardware component, a failed software component, or both, associated with a port of the network device 10, for example the port 26A. Such a failure can also result from a failed transmission medium coupled to the port 26A.

Figure 13B:
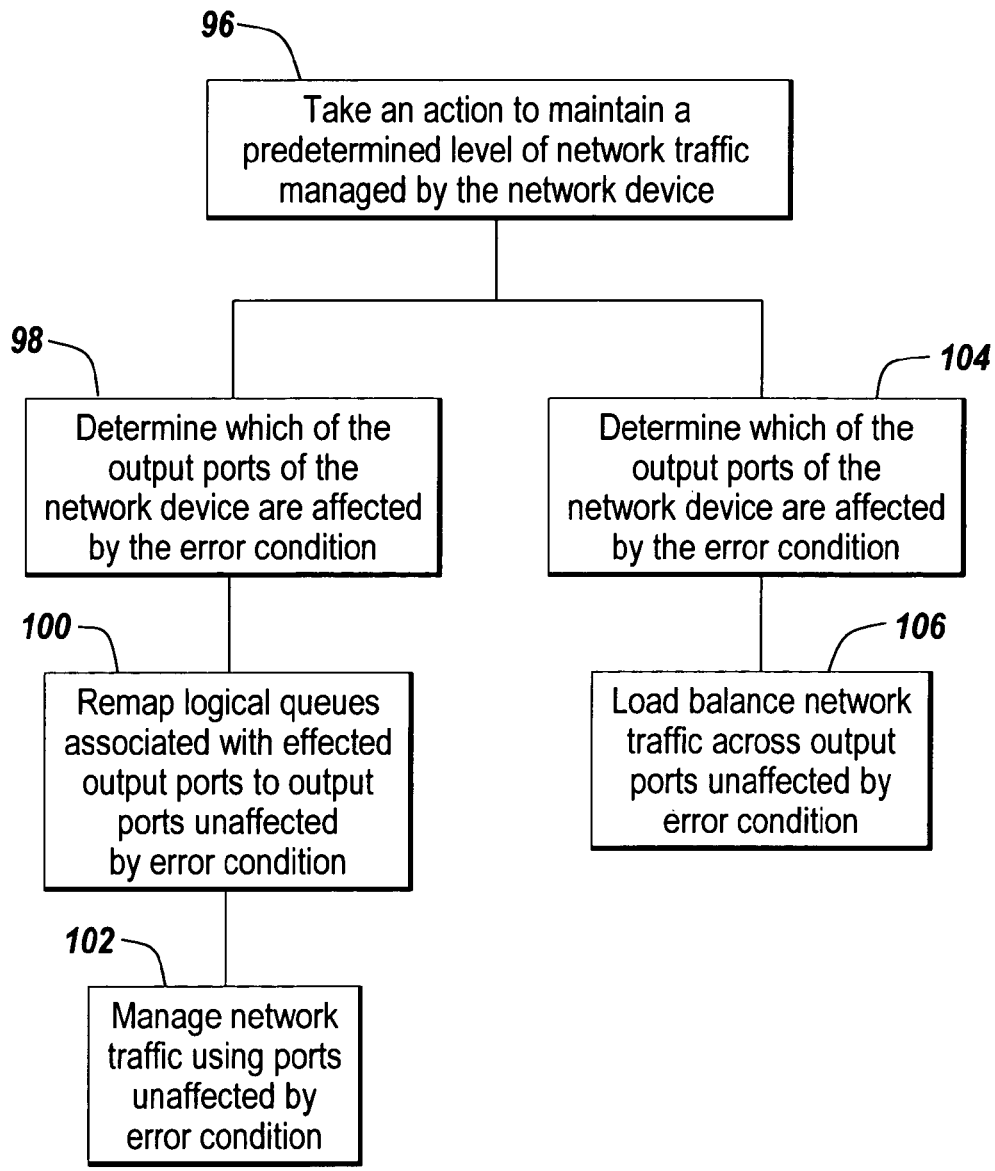
FIG. 13B illustrates a step taken in FIG. 13A in more detail.

FIG. 13B illustrates step 96 of FIG. 13A in more detail. The block flow diagram depicted in FIG. 13B illustrates two possible actions the network device 10 can take upon detection of an event that affects transmission capacity of network device 10. One exemplary action is defined in FIG. 13B by steps 96-102 and another exemplary action is defined in FIG. 13B by steps 96, 104 and 106. FIG. 13B is discussed in conjunction with FIGS. 12B, 14A, and 14B. Nevertheless, the network device 10 is not limited to the recovery mechanisms illustrated in FIG. 13B, as described below in more detail.

One suitable recovery scenario performable by the network device 10 adapts to the recognition of the failed port and reconfigures the network device 10 to operate in a traditional load balancing mode of operation while attempting to preserve the highest priority class of network traffic. As such, in step 104, the network device 10 determines which output port is affected by the detected event. In response to the detected failure of one or more of the ports 26A-26D, the network device 10 in step 106, initializes another load share function, for example, the load share function 38D. Furthermore, the logical scheduler 22 remaps or re-associates the logical queues (0-7) and the corresponding classes on network traffic to the physical queues 16E-16P. For example, the network device 10 reduces the number of the logical queues available to the virtual port 27 from eight to four (logical queues (0-3)) and as such reduces the granularity of class types distributed across the remaining operational physical ports. As such, with this failure recovery methodology the logical scheduler 22 remaps the association and distribution of network traffic based on classification across the logical queues (0-3) and hence the physical queues 16E-16P.

As a result, after the failure associated with the physical port 26A, the logical scheduler 22 remaps the highest class of network traffic, which is associated with logical queue (0) to the new load share function 38D, which balances the class of network traffic associated with logical queue (0) across the physical queues 16E, 16I, and 16M. In this manner, for example, certain network traffic of the highest priority associated with the logical queue (0) remains the highest priority network traffic, even after the diminished capacity of the physical port 26A, and such network traffic is load balanced across the remainder of the physical ports to maintain a desired transmission rate or transport delay.

In like fashion, network traffic associated with the logical queue (1) is directed by the load share function 38A from an input buffer to one of the physical queues 16F, 16J, and 16N to load balance network traffic associated with the logical queue (1) across the physical ports 26B-26D. Likewise, network traffic associated with the logical queue (2) is directed by the load share function 38B from an input buffer to one of the physical queues 16G, 16K, and 16O to provide load balancing of associated network traffic across the ports 26B-26D. Further, network traffic associated with the logical queue (3) is directed by the load share function 38C across the physical queues 16H, 16L, and 16P, to distribute network traffic across the physical ports 26B-26D.

Those skilled in the art will recognize that in place of the initialization of the load share function 38D, the network device 10 or some other network device can instruct a previously initialized load share function, for example, the load share function 38A, to increase its load balancing capacity to load balance network traffic from one or more additional logical queues across one or more of the remaining operational ports. Moreover, those skilled in the art will appreciate that the network device 10 illustrated in FIG. 12B is merely one example of the network device 10 implementing a recovery mechanism in accordance with the teachings of the present invention to maintain a desired transmission rate for one or more classes of network traffic in the event the network device 10 realizes a diminished transmission capacity.

Figure 14A:
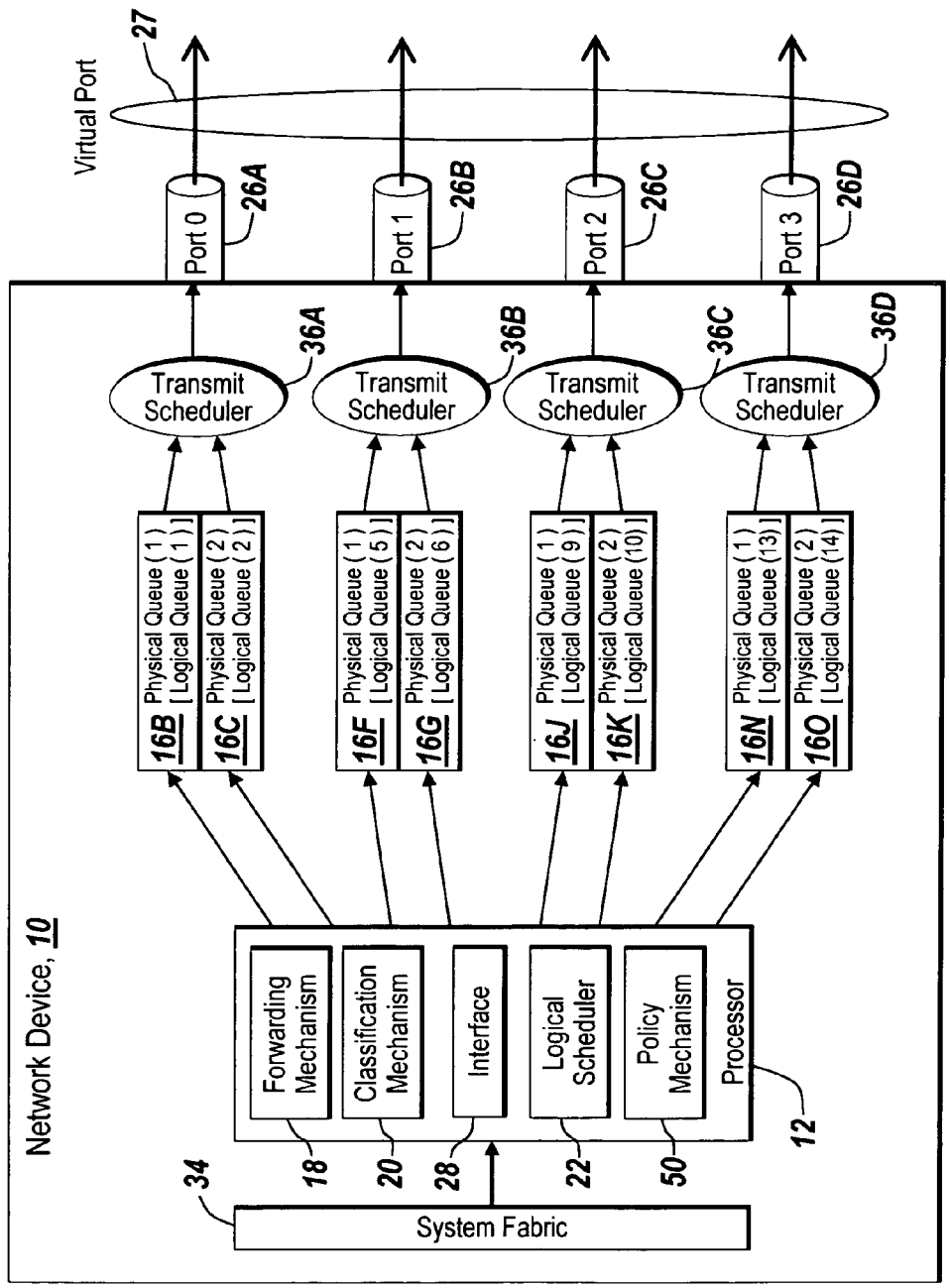
FIG. 14A illustrates another exemplary apparatus suitable for practicing the illustrative embodiment of the present invention after detection of an error condition that affects network traffic managed by its exemplary apparatus.

FIG. 14A depicts another exemplary recovery mechanism performed by the network device 10 upon detection of an error condition that affects management or transmission of network traffic by the network device 10. FIG. 14B illustrates an exemplary failure recovery Table 108 that defines the new mapping of logical queues (0-7) by the logical scheduler 22 upon detection of an event and determination that the event prevents the network device 10 from supporting a desired transmission capability on one or more of the ports. The data structure of Table 108 and the network device 10 of FIG. 14A illustrate that the present invention allows a network operator, system administrator, or network owner to assign weights to the logical queues (0-7) and, as such, classes of network traffic according to pre-defined criteria, and, in turn, the physical queues of the network device 10. As such, if the network device 10 realizes a diminished transmission capacity, the network device 10 can evaluate the absolute weights assigned to the network traffic affected by the diminished capacity and redirect network traffic from the port affected to the remaining operating ports and physical queues based on a comparison of the weights assigned to the logical queues and the weights assigned to the physical ports and associated physical queues, and if any, one or more load balancing mechanisms.

Those skilled in the art will recognize that multiple classes of network traffic can have the same weighted value. Nevertheless, the highest priority classes of network traffic are weighted with the highest weight value, and as such, the network operator then assigns weight values to the remaining classes of network traffic with descending weight values based on the level of priority associated with each class of network traffic. The lowest priority class of network traffic is in turn assigned the lowest weight value. Nevertheless, those skilled in the art will recognize that the network operator, network owner, or network administrator can assign weighted values to classes of network traffic in an ascending manner so that the highest priority class of network traffic has the lowest weight value and the lowest priority class of network traffic has the highest weight value.

Table 108 illustrates that before any event occurs that affects the transmission capacity of network device 10, the network operator, network provider, or system administrator assigns a weight value to each of the logical queues (0-7) and weight values to each of the physical queues 16A-16H and hence to the ports 26A-26D. In one embodiment of the present invention, if a particular class of network traffic is directed through a particular physical queue, that physical queue is assigned the same weight value as the class of network traffic handled by the physical queue. As such, should a port fail or a transmission medium associated with the port fail, the network device 10 evaluates the logical queues affected by the faulty mechanism and compares the weight values of the affected logical queue to the weights assigned to the remaining operational physical queues. In turn, the network device 10 redirects network traffic based on the assigned weight values to the remaining operational ports.

Referring back to FIG. 13B, in step 98, if the network device 10 determines that one or more of the ports 26A-26D have a diminished transmission capacity, the network device 10 evaluates the logical queues affected by the diminished capacity port and compares the weight values of the logical queues affected by the reduction in capacity with the weight values assigned to the remaining operational physical queues and physical ports. In step 100, the network device 10 redirects network traffic based on the weight values assigned to the logical queues and the weight values assigned to the remaining physical queues associated with the remaining operational ports. As an example, if a port fails that supports a first class of network traffic assigned a weight value of eight the network device 10 redirects the first class of network traffic assigned the weight value of eight to a port and physical queue assigned a weight value of seven. If there is no port and physical queue with a weight value of seven operational, the network device 10 redirects the network traffic of weight value eight to the physical queue and port of the next lowest weight value. When the network device 10 reassigns the higher weighted network traffic to the appropriate functioning physical queue and port, the lower weighted network traffic that had been previously assigned and transmitted through the lower weighted port and physical queue are reassigned to another port and physical queue using the same technique. Accordingly, in step 102, the network device 10 manages multiple classes of network traffic using ports unaffected by the detected event.

Should the network device 10 be left with only one operational port and physical queue, the network device 10 can combine the various weighted classes of network traffic and direct the combined traffic to the appropriate port and queue. As such, the network operator, network provider, or system administrator can configure the network device 10 to combine like weighted streams of network traffic in the event of a failure. To preserve the precedence of the class of network traffic by weight, the network device 10 can combine classes of network traffic with lower weight values without combining higher weighted classes to maintain a desired transmission rate for the higher weighted classes of network traffic. Furthermore, the network operator, network owner, or system administrator can configure the network device 10 so that in the event of a failure, classes of network traffic with the higher weight values are preserved while the classes of network traffic with lower weight values are dropped.

Table 108 illustrates an exemplary weight assignment for use with the network device 10. According to Table 108, the logical queue (0) and the logical queue (1) are each assigned a weight value of eight. In turn, the physical queue 16A and the physical queue 16B of the port 26A are each assigned a weight value of eight. In the event that the port 26A exhibits a diminished transmission capacity, the logical queue (0) is remapped to the physical queue 16E of the port 26C; the logical queue (2) is remapped to the physical queue 16G of the port 26D; the logical queue (4) is remapped to the physical queue 16D of the port 26B; the logical queue (5) is remapped to the physical queue 16F of the port 26C; and the logical queue (6) is remapped to the physical queue 16H of the port 26D. Table 108 further illustrates other exemplary mappings in the event that other ports fail, for example, if the port 26A and 26B fail the logical queue (0) is remapped to the physical queue 16E of the port 26C; the logical queue (1) is remapped to the physical queue 16G of the port 26D; the logical queues (2, 3) are remapped to the physical queue 16F of the port 26C; and the logical queues (4-6) are remapped to the physical queue 16H of the port 26D. Likewise, if the ports 26A, 26B, and 26C fail, the logical queues (0,1) are remapped to the physical queue 16G of the port 26D and the logical queues (2-6) are remapped to the physical queue 16H of the port 26D.

The network provider, network operator, or system administrator can configure the network device 10 to combine equally weighted network traffic streams regardless of the availability of a physical port or a physical queue with assigned lower weight. In this manner, the network device 10 tries to preserve the precedence of network traffic classes by weight value by combining network traffic classes having lower weighted values. Moreover, the network device 10 is configurable to try and preserve the precedence of network traffic classes by weight value by combining classes of network traffic classes with assigned lower weight values whenever the network device 10 realizes a diminished capability to transmit network traffic. As such, the network device 10 can drop network traffic classes with lower weighted values to preserve the network traffic classes assigned higher weight values. For example, if the network device 10 is configured with the four logical queues (0-3) to support four classes of network traffic, with the logical queue (0) having the highest weight value, the logical queue (1) having the next highest weight value, the logical queue (2) having the third highest weight value, and the logical queue (3) having the lowest weight value. Further, the network device 10 is configured with two physical ports and each port includes two physical queues. If one port fails then the network device 10 directs network traffic associated with the logical queue (0) to the highest weighted physical remaining operational and network traffic associated with the logical queue (1) to the remaining physical queue with the next highest weight value. Network traffic associated with the logical queues (3, 4) would be discarded by the network device 10. In the non-strictly enforce mode of operation, network traffic from the logical queue (0) is assigned to the operational physical queue with the highest weight value and the network traffic associated with logical queues (1,2,3) are combined and directed to the remaining operational physical queue having the lower weight value. Those skilled in the art will appreciate and recognize that other failure recovery mechanisms are possible for use with the network device 10, for example, the network operator, network provider, or system administrator can statistically define the failure remapping performed by the network device 10.

The illustrative embodiment of the present invention is beneficially adaptable to use physical interfaces with different operational characteristics, for example, ports handling network traffic at different bit per-second rates or speeds. Those skilled in the art will appreciate that conventional load balancing algorithms often used with link aggregation methodologies and technologies require all the physical ports forming the link aggregation group to be of the same technology and have like performance characteristics. Having like physical ports of like performance characteristics thus simplifies the structure, function, and operation of the load balancing algorithm to distribute a network traffic load because all ports have like port transmission rates and delay rates. Nevertheless, the illustrative embodiment of the present invention allows and supports the transmission of network traffic requiring low latency characteristics for various applications while supporting traditional network traffic. As such, the illustrative embodiment of the present invention beneficially allows a network device to use a lower cost interface, which often uses lower performance technology for expedited low latency network traffic and use a higher performance network interface for best effort or shaped network traffic across a link aggregation group if desired.

Figure 15A:
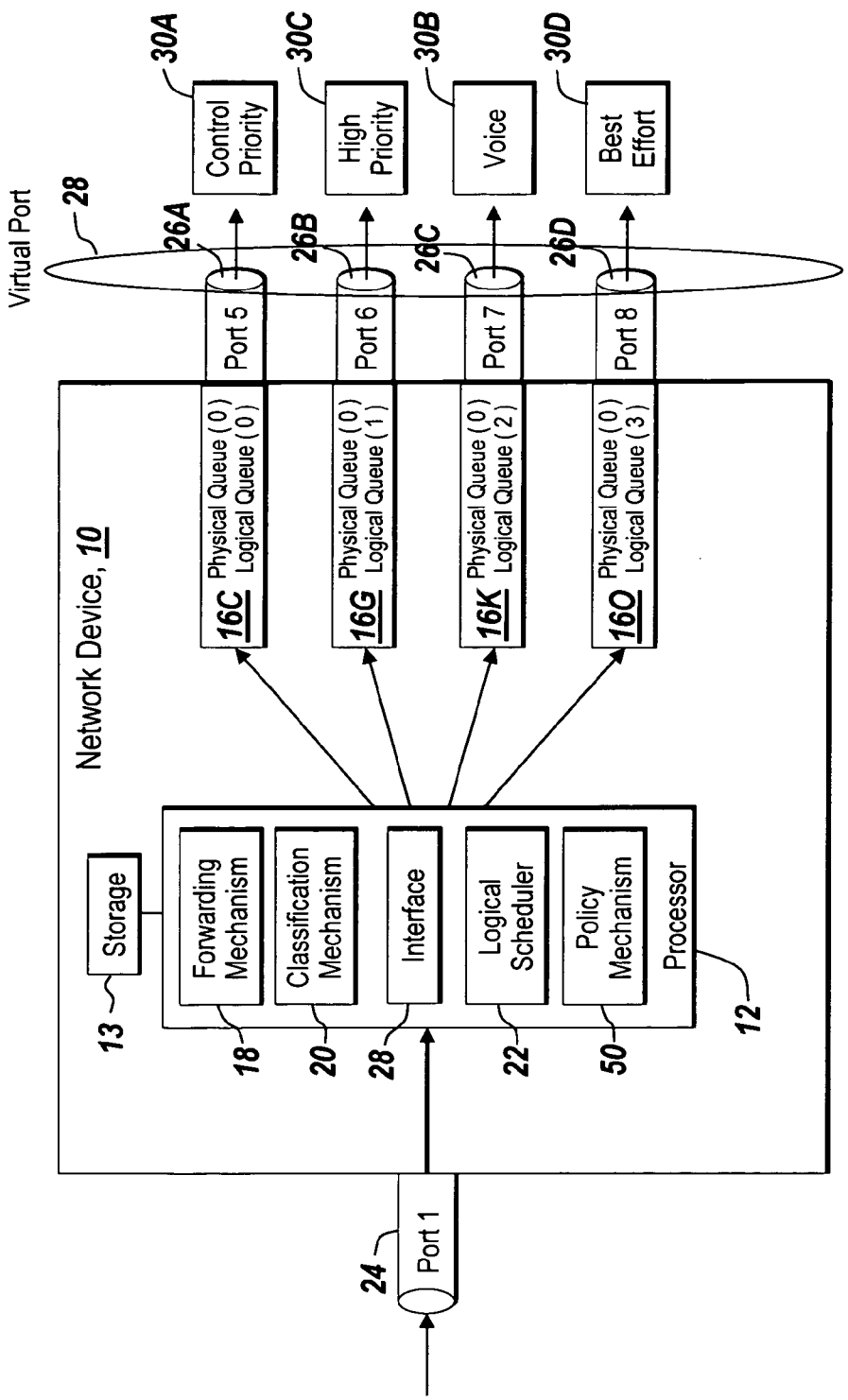
FIG. 15A illustrates another exemplary apparatus suitable for practicing the teachings of the present invention.

FIG. 15A illustrates the network device 10 configured with an unbalanced link aggregation group or virtual port 28 formed from the physical ports having different bandwidth capabilities. For example, the port 26A operates with a bandwidth value "X" while each of the ports 26B, 26C, and 26D operate with a bandwidth value "N" times greater than "X" or "NX." As such, the virtual port 28 of the network device 10 in FIG. 15A represents an unbalanced bundle of ports.

The classification mechanism 20 examines and classifies network traffic received on the port 24. The forwarding mechanism 18 forwards received network traffic to one of the physical queues 16A-16D based on the classification determined by the classification mechanism 20 and the logical queue to the physical queue mapping provided by the logical scheduler 22. In most applications, the network traffic of the highest priority requires the least amount of bandwidth. As such, the control priority network traffic is mapped to the physical queue 16A represented by the logical queue (0). The other lesser priority network traffic is mapped to the logical queues associated with the higher bandwidth ports 26B-26D. As such, the network device 10 is configurable to include a lower cost interface technology to service the highest priority class or classes of network traffic using a lower bandwidth capacity port. Likewise, the network device 10 is configurable to service other network traffic such as voice priority traffic 30B, high priority traffic 30C and best effort traffic 30D using ports having higher cost interface technology and hence, a higher bandwidth capacity.

Figure 15B:
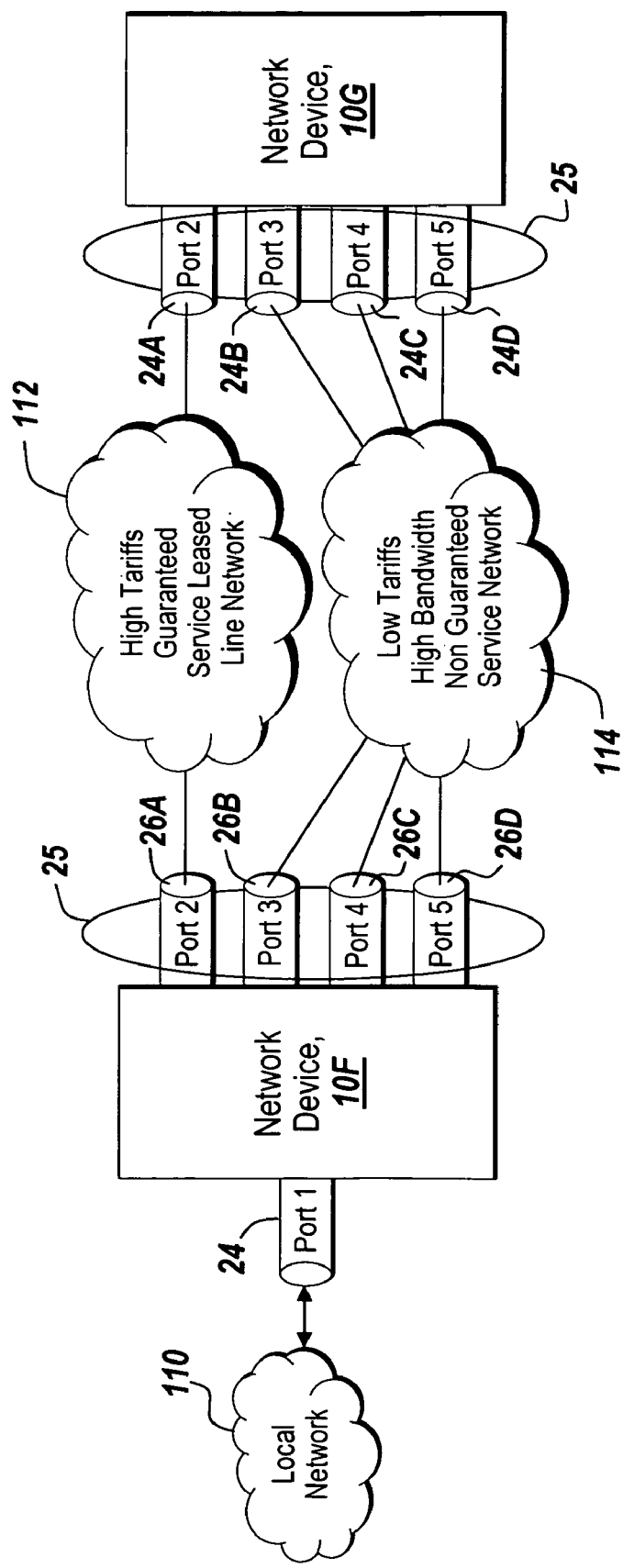
FIG. 15B illustrates an exemplary network environment suitable for practicing the teachings of the present invention.

FIG. 15B illustrates another exemplary embodiment where the network device 10, as represented by network devices 10F and 10G, are each adapted to support an unbalanced link aggregation group 25. Network device 10F is configured to include the unbalanced link aggregation group 25 formed from the ports 26A-26D. Network device 10G is configured to include the unbalanced link aggregation group 25B formed from the ports 24A-24D.

Network device 10F receives network traffic from local network 110 on input port 24 and, in turn, distributes the network traffic on output ports 26A-26D via the unbalanced link aggregation group 25. The output port 26A is coupled to a high tariffs guaranteed service leased line network 112 and output ports 26B-26D are coupled to a low tariffs high bandwidth non guaranteed service network 114. In this manner, the network device 10F operates, for example, as a remote office WAN router.

Network device 10G receives network traffic from the high tariffs guaranteed service leased line network 112 on input port 24A and receives network traffic from the low tariffs high bandwidth non guaranteed service network 114 on input ports 24B-24D. In this manner, the network device 10 G operates, for example, as a central site WAN router.

The ports 26A, 26B, 26C, and 26D of the network device 10F and the ports 24A, 24B, 24C, and 24D of the network device 10G are configured to support a multiple link point-to-point protocol bundle. The port 26A of the network device 10F and the port 24A of the network device 10G are each configured to have a like bandwidth. As illustrated in FIG. 15B the ports 26A and 24A have a bandwidth value less than a bandwidth value of any of the other ports included in the multiple link point-to-point protocol bundle. For example, the ports 26A and 24A each have a bandwidth of about 256 kilobytes per second. In contrast, the ports 26B, 26C, and 26D of the network device 10E and the ports 24D, 24C, and 24D of the network device 10F are each configured to have a bandwidth of about 1.44 megabytes per second.

As mentioned above, the network device 10G is configurable to operate as a central site WAN router. The performance characteristics of the input ports 24A-24D of the network device 10G substantially match the performance characteristics of the output ports 26A-26D of the network device 10F. The network device 10F and the network device 10G are interconnected by the link aggregation group 25 configured as an unbalanced bundle of ports capable of supporting multilink point-to-point protocol.

In this manner, the port 26A of the network device 10F and the port 24A of the network device 10G are capable of supporting a high tariff guaranteed service class of network traffic on the network 112. Further, the ports 26B-26D of the network device 10F and the ports 24B-24D of the network device 10G support network traffic having low tariffs, but high bandwidth requirements with no guaranteed service on the network 114. As such, the network device 10 is able to support an unbalanced link aggregation group 25 so that high priority traffic can be sent on network interfaces having lower bandwidth capabilities and hence a lower cost, and still meet service level agreement requirements for high priority network traffic.

Figure 15C:
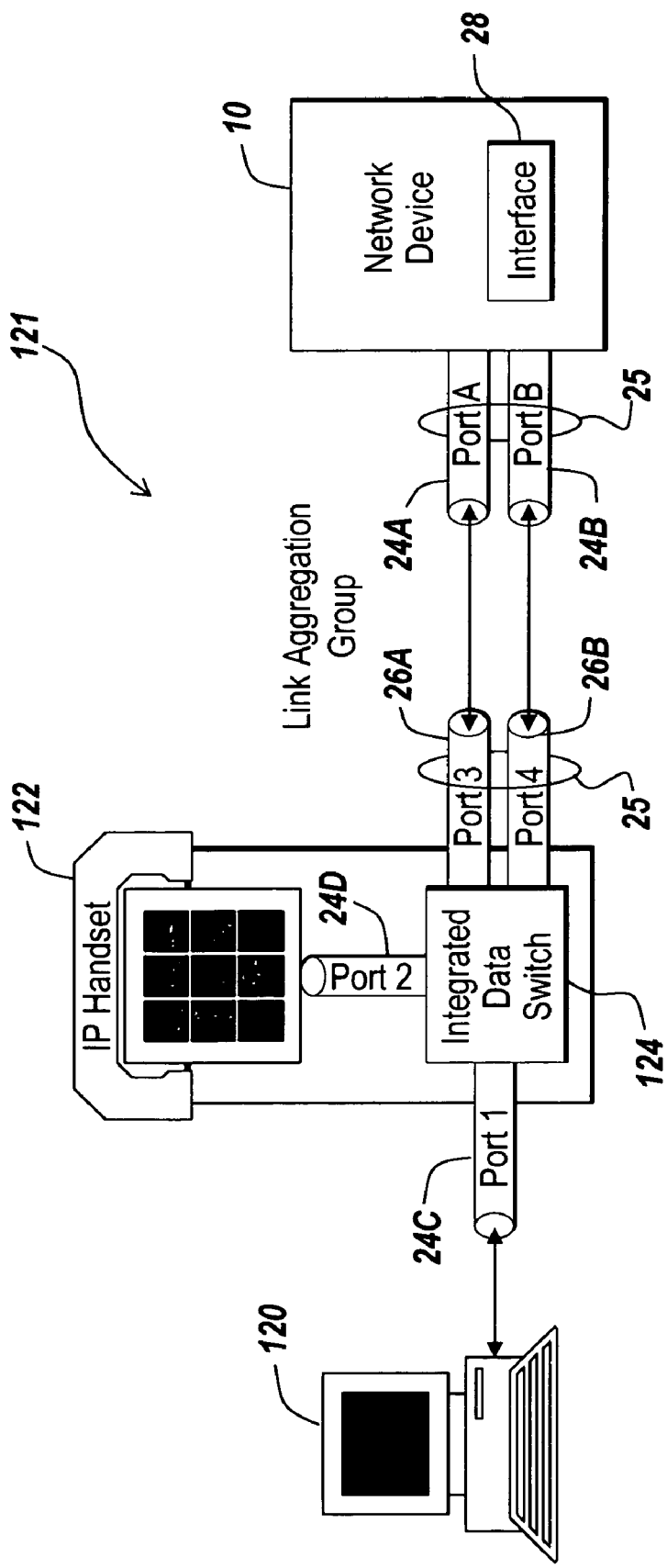
FIG. 15C illustrates a further exemplary network environment suitable for practicing the teachings of the present invention.

FIG. 15C illustrates a further illustrative embodiment of the present invention where network environment 121 includes the network device 10 configured to support unbalanced link aggregation group 25. The unbalanced link aggregation group 25 is formed from the port 24A and the port 24B of the network device 10 and from the ports 26A and 26B of VoIP handset 122. The network device 10 is coupled to the VoIP handset 122, which, in turn, is coupled to network device 120. The VoIP handset 122 optionally includes an integrated data switch 124 capable of monitoring the condition of the network environment 121, the VoIP handset 122, and the network device 120 and route voice traffic accordingly.

The integrated data switch 124 is coupled to the VOID handset 122 by port 24D and is coupled to the network device 120 by port 24C. In the absence of the integrated data switch 124, the VoIP handset 122 is coupled to port 26A either directly or indirectly by another intermediary device. Likewise, in the absence of the integrated data switch 124, the network device 120 is coupled either, directly or indirectly through another intermediary device, to the port 26B. The port 24D and the port 26A of the VoIP handset 122 are adapted for voice traffic, for example, full duplex 10 megabyte/second Ethernet ports. The ports 24C and 26B are adapted to support data traffic, for example, 100 megabytes/second Ethernet ports.

The network device 10 includes the port 24A adapted to support a 10 megabyte/second Ethernet connection, and the port 24B adapted to support a 100 megabytes/second Ethernet connection port. As such, the link aggregation group 25 is an unbalanced bundle so that voice traffic from VoIP handset 122 is handled on the port 24A, while data traffic from the network device 120 is handled on the port 24B. In this manner, the network device 10 can support mixed levels of network traffic classes and at the same time use lower cost interface technology to support low latency applications while simultaneously supporting other network traffic without critical latency requirements on one or more other ports.

Figure 16:
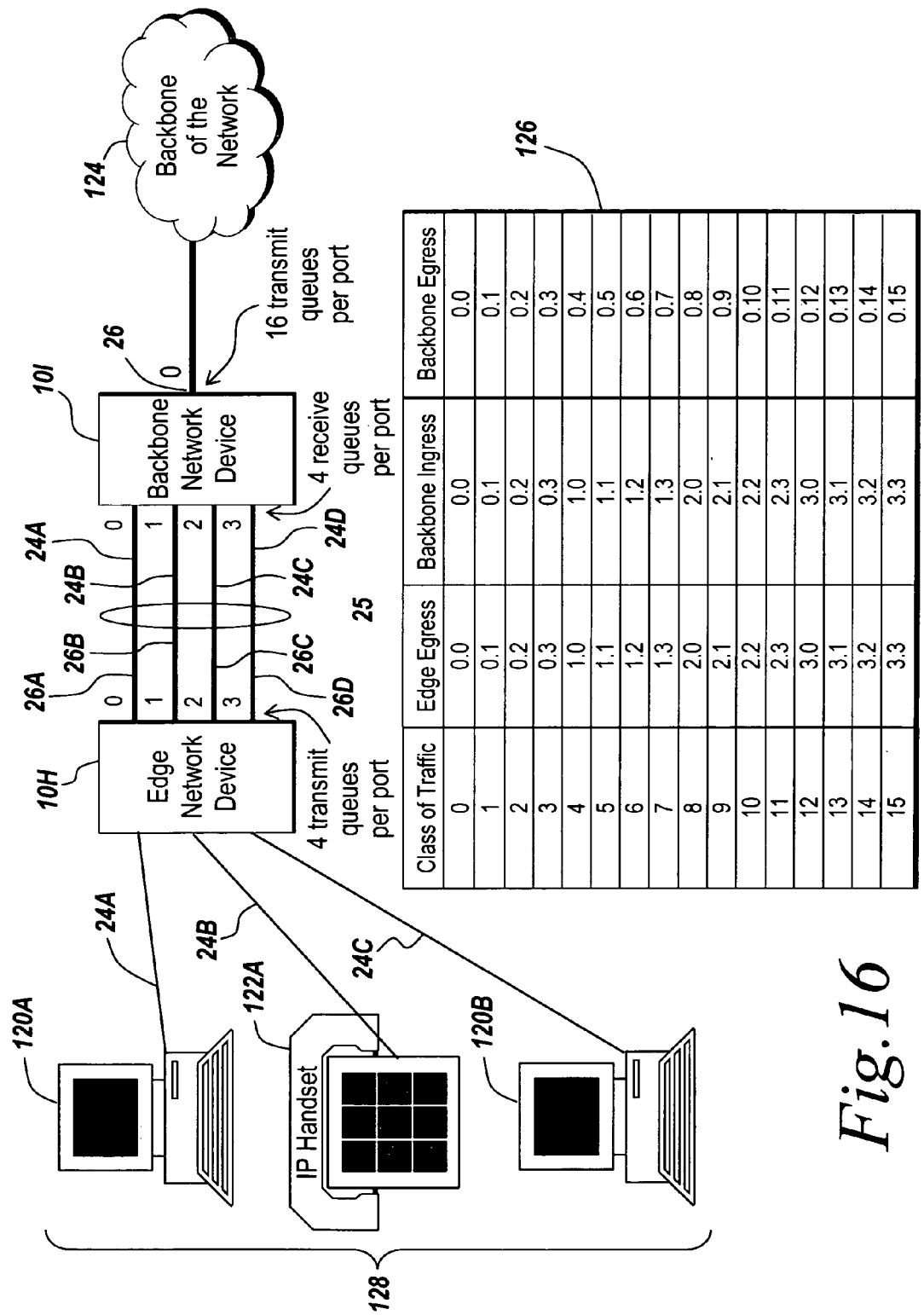
FIG. 16 illustrates a further exemplary network environment suitable for practicing the illustrative embodiment of the present invention.

FIG. 16 depicts a further embodiment of the present invention. One skilled in the art will recognize that network devices with lower levels of features and capabilities are often placed at the edge of the network in close proximity to a user's environment. For example, edge network device 10H communicates with network devices 120A, 120B, and VoIP handset 122A in user environment 128. The network device 10H includes four transmit physical queues (not illustrated in FIG. 16) per port. That is, each of the physical ports 26A-26D has associated therewith four physical queues.

One manner of configuring a network is to connect an edge network device such as, the edge network device 10H to a higher functionality device such as backbone network device 10I. The backbone network device 10I aggregates multiple edge devices and then connects the various user environments to network backbone 124. The backbone network device 10I typically includes more features and capabilities than the edge network device 10H and, hence, is more costly than the edge network device 10H. As such, the edge network device 10H, which includes four physical queues per port, is configured in accordance with the illustrative embodiment of the present invention to support sixteen logical queues (0-15) to provide sixteen classes of network traffic on the link aggregation group 25.

The backbone network device 10I includes, for example, two types of port interface modules. One type of port interface module is considered a lower cost module having four transmit and receive physical queues per port. The other type of port interface module is considered a higher cost module with additional functionality and sixteen transmit and receive physical queues per port. Nevertheless, the edge network device 10I supports sixteen logical queues (0-15) on the input ports 24A-24D associated with the link aggregation group 25. Accordingly, the backbone network device 10I supports sixteen classes of network traffic. In like manner, the backbone network device 10I is adaptable to use the first type of interface module having four receive physical queues per port to interface with the edge network device 10H and realize a virtual interface having sixteen logical queues in accordance with the present invention to support sixteen classes of network traffic using four interface modules having four physical queues each.

In this manner, the illustrative embodiment of the present invention facilitates a network operation where lower cost ports are provisioned in a backbone network device, such as the backbone network device 10I, to aggregate edge devices, such as the edge network device 10H, while simultaneously supporting higher levels of service to the backbone 124. The illustrative embodiment of the present invention facilitates this structure by using a logical concatenation queue to actual queue mapping methodology. Accordingly, the logical queues of the edge network device 10H available to a virtual port formed by link aggregation group 25 and the logical queues of the backbone network device 10I available to the virtual port formed by the link aggregation group 25 are mapped between each device and to the advanced backbone ports connecting the backbone network device 10H to the network backbone 124.

Table 126 illustrates an exemplary logical concatenation traffic distribution mapping between the edge network device 10H, the backbone network device 10I and the network backbone 124. As such, the network traffic associated with class of service "0" is forwarded from the physical queue (0) of the port 26A on the edge network device 10H to the physical queue (0) of the ingress port 24A of the backbone network device 10I. In turn, the received network traffic associated with class of service "0" is forwarded by the backbone network device 10I from the physical queue (0) of the ingress port 24A to the physical queue (0) of the port 26 on the backbone network device 10I for transmission on the network backbone 124. Further, network traffic from the network devices 120A, 120B or VOID handset 122A associated with class of service "1" is forwarded from the physical queue (1) of the port 26A on the edge network device 10H to the physical queue (1) of the ingress port 24A of the backbone network device 10I, and, in turn, to the physical queue (1) on the output port 26 of the edge network device 10I for transmission on the network backbone 124. Those skilled in the art will recognize from the table 126 the remaining class of network traffic/queue mapping between the edge network device 10H and the backbone network device 10I to support sixteen classes of network traffic using four physical queues per port between the edge network device 10H and the backbone network device 10I.

Figure 17:
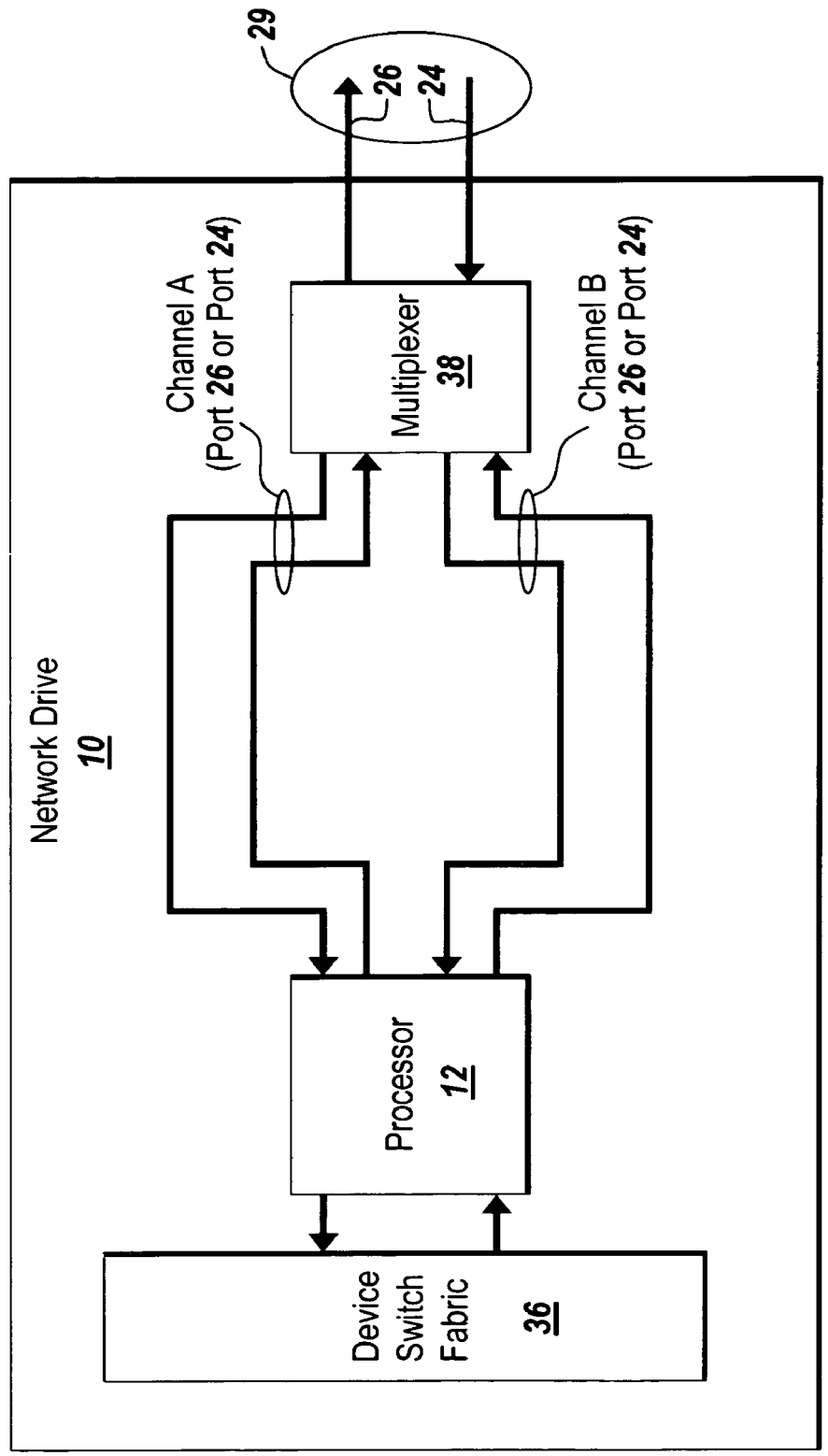
FIG. 17 illustrates an exemplary apparatus suitable for practicing the illustrative embodiment of the present invention.

In one illustrative embodiment of the present invention as depicted in FIG. 17, a network device in accordance with the teachings of the present invention beneficially provides an increase in the granularity level of class of service support within the structure of a network device. Generally, most hardware architectures of network devices support a fixed number of classes of service per logical interface and at best a fixed number of classes of service across the device's fabric. Those skilled in the art will recognize that the fixed number of classes of service across the device fabric depends in part on the device's structure and architecture. As such, the network device 10 can support a greater number of queues than the architecture and structure of a physical port can typically support. The illustrative embodiment of the present invention allows the network device 10 to multiplex ports within the device's fabric into a single physical port. The bandwidth allocated to the single physical port is equal to that of a single interface or, alternatively, is equal to a total output bandwidth greater than that of a single port. The total bandwidth can be based on the summation of two or more ports, although the total bandwidth does not have to equal the summation of the combined or multiplexed ports.

FIG. 17 illustrates the network device 10 is configurable to include a port 29 having a ten gigabyte per second capability formed by multiplexing ports 24 and 26. The port 26 represents channel A having N queues and the port 24 represents channel B having N queues. The network device 10 includes a multiplexer 38, which performs a multiplexing function to concatenate the channel A and the channel B into the port 29, which represents the summation of the queues from channel A and channel B. The network device 10 illustrated in FIG. 17 provides a balanced model of operation, by which the port 29 operates at the same rate as channel A or channel B. That is, the selected physical port of the network device 10 is represented by a single ten gigabytes/second interface and thus channel A and channel B operate at a rate of ten gigabytes/second. Those skilled in the art will recognize that it is also possible to operate the network device 10 illustrated in FIG. 17 such that the port 29 represents the sum of the queues for channel A and channel B, but also represents the bandwidth of the combined channels.

Figure 18:
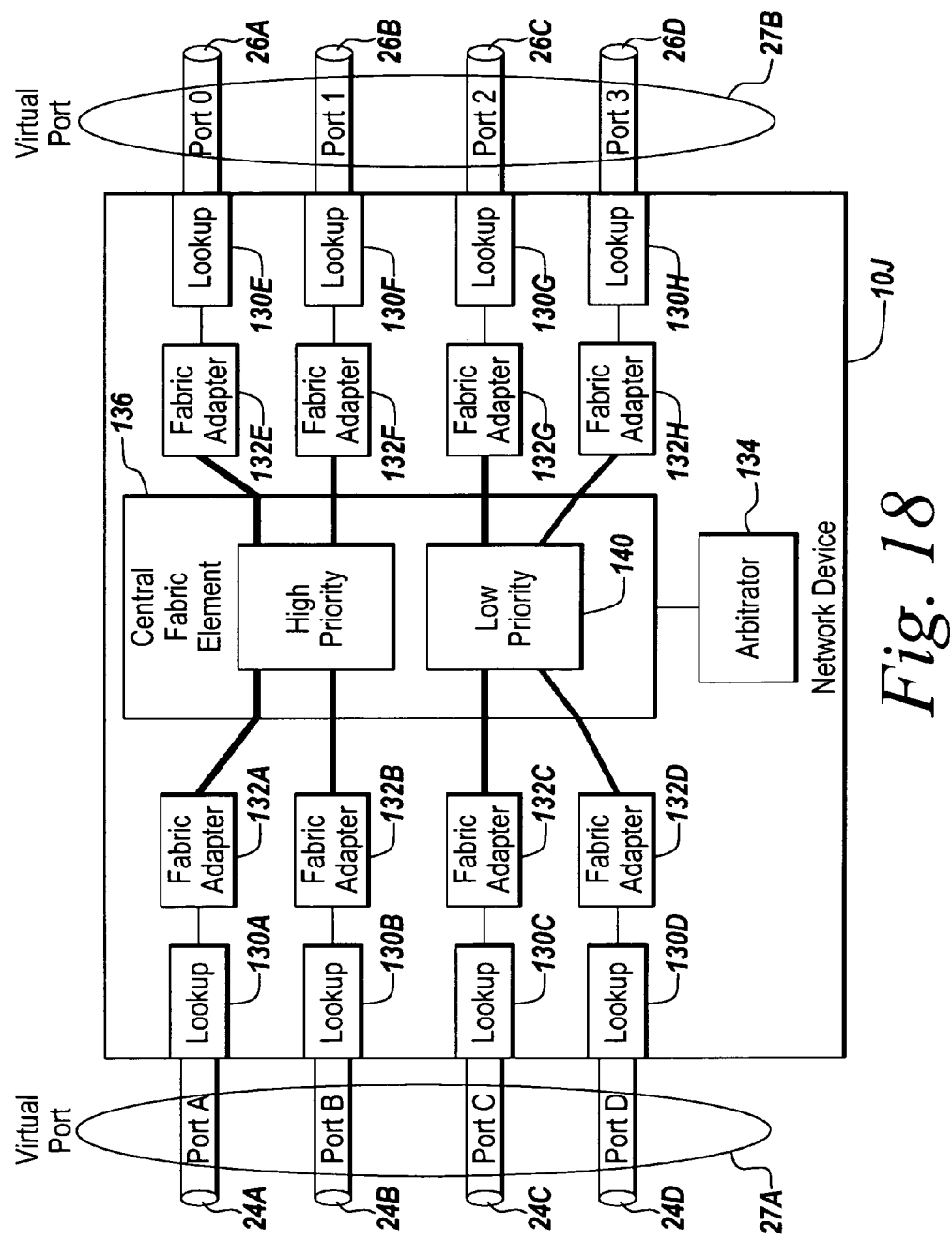
FIG. 18 illustrates a further exemplary apparatus suitable for practicing the illustrative embodiment of the present invention.

FIG. 18 depicts another illustrative embodiment of the network device 10. Network device 10J includes a central fabric element 136 coupled to fabric adaptors 132A-132H, which, in turn, are coupled to look-up mechanisms 130A-130H, respectively. The network device 10J includes input ports 24A-24D bundled into a link aggregation group to form a virtual port 27A and output ports 26A-26D bundled together into a link aggregation group to form a virtual port 27B. The network device 10J further includes an arbitrator 134. The central fabric element 136 includes high priority queues 138 and low priority queues 140. The central fabric element 136 forwards data between the ports 24A-24D and the ports 26A-26D. Those skilled in the art will recognize that in some network device structures and architectures the central fabric element supports only a limited number of physical queues. Moreover, in many instances, it is not practical to build a network device that supports numerous simultaneous classes of network traffic over a single element. Nonetheless, in accordance with the present invention the network device 10J allows for multiple priority classes of network traffic across a network device fabric.

The network device 10J is configured in accordance with the present invention to support four classes of network traffic using the central fabric element 136 although the central fabric element 136 was designed to support two classes of network traffic, a high priority class and a low priority class. The arbitrator 134 is an arbitration mechanism that arbitrates between the various interfaces connected to the central fabric element 136 to resolve competing demands for access to the central fabric element 136.

In accordance with the illustrative embodiment of the present invention, each physical port forming the virtual port 27A and each port forming the virtual port 27B are representative of a class of network traffic. The arbitrator 134 is configured to give higher priority to the ports bundled in link aggregation groups forming the virtual ports 27A and 27B assigned the highest priority. For example, the ports 24A, 24B, 26A, and 26B are assigned to high priority queues 138, while the ports 24C, 24D, 26C, and 26D are assigned to low priority queues 140. As such, the arbitrator 134 provides the ports 24A, 24B, 26A, and 26B higher priority access to the central fabric element 136 over the ports 24C, 24D, 26C, and 26D. Thus, by ensuring high priority access for specific interfaces or channels into the central fabric element 136 there is created multiple classes across the system fabric. As such, the network device 10J manages four classes of network traffic across a two class fabric element.

The network device 10J illustrated in FIG. 18 depicts the operation of a switching system that is only capable of forwarding traffic from one group of ports to another group of ports across a fabric that links the ports with two classes of service. By leveraging the present invention, a system operator can realize more then two classes of service. This illustrative embodiment of the present invention beneficially leverages a Look-up table and an arbiter to achieve four class of service levels. The central fabric element 136, which interconnects functional blocks that contain physical ports, has high priority queues 138 and low priority queues 140. Network traffic sent to the high priority queues 138 ensure the high priority class of network traffic is always processed by an internal scheduler of the network device 10J before network traffic is sent to the low priority queues 140 in the central fabric element 136.

In this embodiment, the ingress ports 24A and 24B are associated with the high priority classes of network traffic in the Look-up tables 130A and 130B. The input ports 24C and 24D are associated with the low priority queues 140. Using the arbiter 134, network traffic received on the port 24A is assigned a higher arbitration value then the port 24B. This means that if packets have been received on the ports 24A and 24B simultaneously and are waiting to be sent to the high priority queues 138 in the central fabric element 136, the arbitrator 134 allows the network traffic received on the port 24A to be sent into the high priority queues 138 of the central fabric element 136 before the network traffic from the port 24B. Simultaneously, the arbitrator 134 assigns a higher value to network traffic received on the port 24C then the network traffic received on the port 24D. This ensures that if two units of network traffic are simultaneously received on the ports 24C and 24D, network traffic from the port 24C is forwarded through the low priority queues 140 of the central fabric element 136 first. Network traffic transmitted through the high priority queues 138 and the low priority queues 140 of the central fabric element 136 are delivered to a transmit port for forwarding. The network traffic may be assigned to a transmit port based on the previous class assignment where the port 26A represents the same class of traffic as the port 24A; the port 26B represents the same class of traffic as the port 24B; the port 26C represents the same class of traffic as the port 24C; and the port 26D represents the same class of traffic as the port 24D, or may use another mechanism to deliver the network traffic. For example, network traffic received on the ports 24A-24D may be assigned to the single port 26A or any other method to distribute traffic.

The present invention has been described with reference to one or more illustrative embodiments thereof, but one skilled in the art will appreciate that there are changes in form and detail that may be made without departing from the intended scope of the present invention that is defined in the pending claims. For example, classification and prioritization of network traffic can be accomplished according to the present invention using a MAC layer scheme, a VLAN tagging and IEEE 802.1P scheme, or a network layer prioritization scheme using a value held in a type of service (ToS) field or a differentiated services field.

What is claimed is:

1. An apparatus associated with a network, the apparatus comprising:
a plurality of physical output ports for transmission of network traffic, wherein a first physical output port and a second physical output port are capable of being arranged as an external link aggregated interface, wherein at least one of the first or second physical output ports is based on a networking standard, the external link aggregated interface configured to represent the first physical output port and the second physical output port as a virtual port;
associated with the first physical output port:
a first set of physical queues for holding units of network traffic prior to transmission through the first physical output port, and
a first transmit scheduler configured to schedule transmission of the units of network traffic from the first set of physical queues through the first physical output port;
associated with the second physical output port:
a second set of physical queues for holding units of network traffic prior to transmission through the second physical output port, and
a second transmit scheduler configured to schedule transmission of the units of network traffic from the second set of physical queues through the second physical output port, wherein the first and second transmit schedulers coordinate scheduling of the first and second physical output ports of the virtual port to manage transmission of the units of network traffic, and wherein the first and second transmit schedulers are capable of operating independently of each other;
a plurality of logical queues associated with the first physical output port and the second physical output port; and
a logical scheduler configured to schedule transmission of units of network traffic associated with the plurality of logical queues to the plurality of physical output ports associated with the virtual port based on a classification of each of the units, the logical scheduler scheduling a plurality of units of network traffic associated with a first of the plurality of logical queues to the first set of physical queues and the second set of physical queues associated with the first physical output port and the second physical output port, respectively, for transmission as further scheduled by the first and second transmit schedulers through the first and second physical output ports, respectively, as the virtual port.

2. The apparatus of claim 1, wherein a number of the plurality of logical queues exceeds a number of physical queues associated with any one of the physical ports of the link aggregated interface.

3. The apparatus of claim 1, further comprising:
a forwarding mechanism configured to forward at least one of the units of network traffic to one of the physical ports forming the virtual port based on the classification of the at least one of the units of network traffic.

4. The apparatus of claim 1, further comprising:
a classification mechanism to classify each of the plurality of units of network traffic received by the apparatus.

5. The apparatus of claim 1, further comprising:
one or more load balancing mechanisms to distribute the plurality of units of network traffic across at least two of the physical ports.

6. In a network device associated with a network, a method comprising;
providing a plurality of physical output ports for transmission of network traffic, wherein a first physical output port and a second physical output port are capable of being arranged as an external link aggregated interface, wherein at least one of the first or second physical output ports is based on a networking standard, the external link aggregated interface configured to represent the first physical output port and the second physical output port as a virtual port;
associating with the first physical output port:
a first set of physical queues for holding units of network traffic prior to transmission through the first physical output port, and
a first transmit scheduler configured to schedule transmission of the units of network traffic from the first set of physical queues through the first physical output port;
associating with the second physical output port:
a second set of physical queues for holding units of network traffic prior to transmission through the second physical output port, and
a second transmit scheduler configured to schedule transmission of the units of network traffic from the second set of physical queues through the second physical output port, wherein the first and second transmit schedulers coordinate scheduling of the first and second physical output ports of the virtual port to manage transmission of the units of network traffic, and wherein the first and second transmit schedulers are capable of operating independently of each other;
defining a plurality of logical queues associated with the first physical output port and the second physical output port; and
scheduling transmission of units of network traffic associated with the plurality of logical queues to the plurality of physical output ports associated with the virtual port based on a classification of each of the units, such that a plurality of units of network traffic associated with a first of the plurality of logical queues are scheduled to the first set of physical queues and the second set of physical queues associated with the first physical output port and the second physical output port, respectively, for transmission as further scheduled by the first and second transmit schedulers through the first and second physical output ports, respectively, as the virtual port.

7. The method of claim 6, further comprising:
parsing at least one of the plurality of units of network traffic received by the network device to identify a desired attribute of the unit of network traffic; and
classifying at least the one unit of network traffic as being associated with one of a plurality of classifications based on the desired attribute.

8. The method of claim 6, wherein the network device comprises at least one of a switch, a router, a bridge, a firewall, a wireless LAN access point, or a computing device.

9. The method of claim 6, wherein the network comprises at least one of a telephone communications network or a data communications network.

10. In a network device associated with a network, a method for managing network traffic, the method comprising:
classifying units of network traffic;
associating the units of network traffic with a plurality of logical queues based on the classification of the units of network traffic;
scheduling the classified units of network traffic associated with a first of the plurality of logical queues to a first set of physical queues and a second set of physical queues associated with a first physical output port and a second physical output port, respectively, the first and second physical output ports being capable of being arranged as an external link aggregated interface which represents the first and second physical output ports as a virtual port, wherein at least one of the first or second physical output ports is based on a networking standard;
scheduling the classified units of network traffic from the first set of physical queues through the first physical output port using a first transmit scheduler;
scheduling the classified units of network traffic from the second set of physical queues through the second physical output port using a second transmit scheduler; and
coordinating scheduling of the first and second physical ports of the virtual port using the first and second transmit schedulers to manage transmission of the classified units of network traffic;
wherein the first and second transmit schedulers are capable of operating independently of each other.

11. The method of claim 10, wherein the units of network traffic comprise any of voice data traffic, video data traffic, or storage data traffic.

12. The method of claim 10, wherein the forwarding of the classified units of network traffic to the first and second sets of physical queues further comprises:
forwarding a portion of the classified units of network traffic to the first and second sets of physical queues according to a load balancing mechanism to manage the network traffic across the first and second physical ports.

13. The method of claim 10, further comprising:
detecting an error condition of the network device;
determining if the detected error condition affects transmission of the network traffic on the first and second physical ports; and
taking an action to maintain a predetermined level of network traffic managed by the network device if the detected error affects transmission of the network traffic on the first and second physical ports.

14. The method of claim 13, wherein the taking of the action further comprises:
determining which of the first and second physical ports are affected by the detected error; and
re-mapping the plurality of logical queues associated with the port affected by the detected error to the physical queues of one or more ports free of the detected error to manage the network traffic received by the network device.

15. The method of claim 13, wherein the taking of the action further comprises:
determining which of the first and second physical ports are affected by the detected error; and
load balancing the network traffic across one or more ports free of the detected error.

16. A network device associated with a network, the network device comprising:
an external link aggregated interface configured to represent a first physical output port and a second physical output port of the network device as an external virtual port, wherein at least one of the first or second physical output ports is based on a networking standard;
a plurality of logical queues associated with the external virtual port of the network device;
a logical scheduler configured to schedule transmission of units of network traffic associated with a first of the plurality of logical queues to a first set of physical queues and a second set of physical queues associated with the first physical output port and the second physical output port, respectively, for transmission through the first and second physical output ports independently of each other as the external virtual port;
a first transmit scheduler configured to schedule transmission of the units of network traffic from the first set of physical queues through the first physical output port; and
a second transmit scheduler configured to schedule transmission of the units of network traffic from the second set of physical queues through the second physical output port;
wherein the first and second transmit schedulers coordinate scheduling of the first and second physical output ports of the virtual port to manage transmission of the units of network traffic, and wherein the first and second transmit schedulers are capable of operating independently of each other.

17. The network device of claim 16, further comprising:
a forwarding mechanism configured to forward at least one of the units of network traffic to one of the physical ports forming the virtual port based on the classification of the at least one of the units of network traffic.

18. The network device of claim 16, further comprising:
a policy mechanism configured to manage transmission of the units of network traffic according to one or more policies.

19. The network device of claim 16, further comprising:
a load share function configured to load balance selected units of network traffic across two or more of the physical ports.

20. A method for scheduling units of network traffic for transmission through a virtual port of a network device, the method comprising:
receiving units of network traffic;
associating the units of network traffic with a plurality of logical queues for transmission according to a quality of service level assigned to each of the units of network traffic;
scheduling the units of network traffic associated with the plurality of logical queues to a plurality of output ports, the plurality of output ports including a first output port and a second output port arranged as an external link aggregated interface which represents the first and second output ports as a virtual port, such that a plurality of the units associated with a first of the plurality of logical queues is scheduled to a first set of physical queues and a second set of physical queues associated with the first output port and the second output port, respectively, for transmission as further scheduled by first and second transmit schedulers through the first and second output ports, respectively, arranged as the virtual port, wherein at least one of the first or second output ports is based on a networking standard;

scheduling transmission of the units of network traffic from the first set of physical queues through the first output port using the first transmit scheduler;

scheduling transmission of the units of network traffic from the second set of physical queues through the second output port using the second transmit scheduler, wherein the first and second transmit schedulers are capable of operating independently of each other; and coordinating scheduling of the first and second output ports of the virtual port using the first and second transmit schedulers to manage transmission of the units of network traffic.

* * * * *